United States Patent
Vu et al.

(10) Patent No.: US 6,767,384 B1
(45) Date of Patent: Jul. 27, 2004

(54) ISOMORPHOUSLY SUBSTITUTED MOLECULAR SIEVE MEMBRANES

(75) Inventors: Tuan Anh Vu, Boulder, CO (US); Richard D. Noble, Boulder, CO (US); John L. Falconer, Boulder, CO (US)

(73) Assignee: The Regents of the University of Colorado, Boulder, CO (US)

( * ) Notice: Subject to any disclaimer, the term of this patent is extended or adjusted under 35 U.S.C. 154(b) by 161 days.

(21) Appl. No.: 09/766,307

(22) Filed: Jan. 19, 2001

Related U.S. Application Data

(60) Provisional application No. 60/177,542, filed on Jan. 21, 2000.

(51) Int. Cl.[7] ............................................. B01J 29/06
(52) U.S. Cl. ............................. 95/45; 502/4; 502/60; 502/64; 502/66; 502/74
(58) Field of Search ............................. 502/4, 60, 61, 502/64, 66, 74; 95/45

(56) References Cited

U.S. PATENT DOCUMENTS

| | | | | |
|---|---|---|---|---|
| 4,699,892 A | * | 10/1987 | Suzuki | 502/4 |
| 5,100,596 A | | 3/1992 | Haag et al. | |
| 5,258,339 A | * | 11/1993 | Ma et al. | 502/4 |
| 5,310,714 A | * | 5/1994 | Grasselli et al. | 502/64 |
| 5,362,522 A | | 11/1994 | Barri et al. | 427/435 |
| 5,413,975 A | * | 5/1995 | Mueller et al. | 502/60 |
| 5,464,798 A | * | 11/1995 | Jia et al. | 502/64 |
| 5,567,664 A | | 10/1996 | Barri et al. | 502/4 |
| 5,663,281 A | | 9/1997 | Brugel | |
| 5,753,121 A | | 5/1998 | Geus et al. | |
| 5,763,104 A | | 6/1998 | Stouffer et al. | |
| 5,779,904 A | * | 7/1998 | Ruderman et al. | 210/500.25 |
| 5,824,617 A | * | 10/1998 | Lai | 502/4 |
| 5,840,957 A | | 11/1998 | Kurian et al. | |
| 5,849,849 A | | 12/1998 | Bhatia | |
| 6,140,263 A | * | 10/2000 | Anstett et al. | 502/4 |
| 6,193,784 B1 | * | 2/2001 | Yazawa et al. | 95/45 |

OTHER PUBLICATIONS

V.A. Tuan, R.D. Noble, and J.L. Falconer "Boron–Substituted ASM–5 Membranes: Preparation and Separation Performance," *AIChE Journal*, vol. 46, No. 6, pp. 1201–1208 (Jun. 2000).

Q. Liu, R.D. Noble, J.L. Falconer, H.H. Funke, "Organics/Water Separation by Pervaporation with a Zeolite Membrane," *J. Membrane Science*, vol. 117, pp. 163–174 (1996).

Tuan, V.A. et al. (Nov. 27, 2000), "Isomorphous substitution of Al, Fe, B, and Ge into MFI–zeolite membranes," Microporous Mesoporous Mater. 41:269–280.

* cited by examiner

Primary Examiner—Kiley Stoner
Assistant Examiner—Christina Ildebrando
(74) Attorney, Agent, or Firm—Greenlee, Winner and Sullivan, P.C.

(57) ABSTRACT

Zeolite membranes that can be used to continuously separate components of mixtures are disclosed. The zeolite membranes are prepared by isomorphous substitution, which allows systematic modification of the zeolite surface and pore structure. Through proper selection of the basic zeolite framework structure and compensating cations, isomorphous substitution permits high separation selectivity without many of the problems associated with zeolite post-synthesis treatments. The inventive method for preparing zeolite membranes is alkali-free and is much simpler than prior methods for making acid hydrogen zeolite membranes, which can be used as catalysts in membrane reactors.

20 Claims, 9 Drawing Sheets

ISOMORPHOUSLY SUBSTITUTED MOLECULAR SIEVE MEMBRANES

CROSS-REFERENCE TO RELATED APPLICATION

This application claims the benefit of U.S. Provisional Application No. 60/177,542, filed Jan. 21, 2000, which is herein incorporated by reference in its entirety for all purposes.

BACKGROUND OF THE INVENTION

1. Field of the Invention

The present invention relates to membranes having molecular sieve properties and/or catalytic activity and to methods for producing and using the membranes, and more particularly, to isomorphously substituted zeolite membranes and their use in selective separations of molecules and in catalytic membrane reactors.

2. Discussion

Zeolites are crystalline aluminosilicates of Group 1 and Group 2 elements. Their basic structural framework can be viewed as a three-dimensional network of $SiO_4$ and $[AlO_4]^-$ tetrahedra, which are linked by oxygen atoms. The structural framework encloses cavities and defines channels or pores that are substantially uniform in size within a specific zeolite. As discussed below, large ions (compensating cations, M) and water molecules occupy some of the cavities and have considerable freedom of movement within the zeolite lattice, which allows zeolites to perform ion exchange processes and reversible dehydration.

Because the zeolite pores are sized to accept molecules of certain dimensions for adsorption while rejecting molecules of larger dimensions, these molecules have come to be known as "molecular sieves." Zeolites have been used commercially in ways that that take advantage of these properties, including adsorption separation processes and shape-selective catalytic processes.

Most commercial applications use zeolites in the form of granules or pellets. Zeolite granules exhibit high porosity and have a uniform pore size between about 0.3 and 1.2 nm that is dependent on the specific zeolite structure. Such granules are the catalysts of choice for the petrochemical industry. Shape-selective effects are possible because the catalytic sites are accessible only within the pores of a zeolite structure, and only those reactant molecules, transition states, intermediates, and/or product molecules with dimensions below a certain critical size can be adsorbed into this pore system. Shape-selective catalysis combines the molecular sieving effect with a catalyzed reaction.

Recently, zeolite membranes have been used to conduct molecular separations. Generally, a membrane can be defined as a semi-permeable barrier between two phases that is capable of restricting the movement of molecules across it in a very specific manner. The semi-permeable nature of the barrier is essential to obtaining an effective separation. A wide variety of molecular materials, mostly organic polymers, have been found to be suitable for use as membranes. However, organic polymer membranes have relatively short service lives because of their sensitivity to solvents and low stability at high temperatures.

Because of their superior thermal, chemical, and mechanical properties, zeolite membranes have substantial advantages over organic polymer membranes. The pore size is uniform within a specific zeolite material, and the pore size of a zeolite membrane can be synthetically tuned by choosing an appropriate zeolite structure and/or by exchanging compensating cations of different diameters. The hydrophilic/hydrophobic nature of a zeolite can be modified by changing the substituted metal (Me) in the framework and the Si/Me ratio. The basic/acidic nature of the zeolite can be modified by exchanging alkaline cations with protons. Moreover, zeolite membranes can be used for catalytic membrane reactors because they combine heterogeneous catalytic sites with membranes that allow only one component of a mixture to selectively permeate across the membrane. Zeolites can be considered as originating from a $SiO_2$ lattice in which $Al^{3+}$ is isomorphously substituted for a portion of tetrahedrally coordinated $Si^{4+}$, and can be represented by the formula:

$$M_{x/n} \cdot [(AlO_2)_x \cdot (SiO_2)_y] \cdot zH_2O \qquad \text{I}$$

where M represent a compensating cation with valence n, y is a number greater than or equal to x, and z is a number between about 10 and 10,000. In an isomorphous substitution, a second (different) element replaces some (or all) of an original element of the crystalline lattice. The second element has similar cation radius and coordination requirements as the original element so that the same basic crystalline structure is maintained.

Because aluminum is trivalent, every tetrahedral $[AlO_4]$ unit carries a negative charge. Consequently, the substitution of aluminum for silicon generates an excess negative charge in the zeolite lattice that must be compensated by cations. These compensating cations may be exchangeable. Accordingly, the ion-exchange capacity of a zeolite is enhanced as the aluminum content is increased. Acid hydrogen forms of zeolites have protons that are loosely attached to their framework structure in lieu of inorganic compensating cations, and these proton sites function as Brönsted acids. Thus, the number of protons that may be attached to the zeolite framework is greater in zeolites having greater aluminum content. Consequently, increases in the aluminum content of a zeolite can result in additional Brönsted acid sites. Zeolites having additional catalytic sites exhibit greater activity in acid catalyzed reactions. Thus, the ion exchange and the catalytic properties of a specific zeolite depend on its chemical composition and, more particularly, on its Si/Al ratio.

Zeolites represented by formula I are often described in terms of their Si/Al ratio, because certain properties of zeolites appear to vary with Si/Al ratio. In an extreme case in which substantially all of the lattice ions are silicon, zeolites can have Si/Al ratios that approach infinity (e.g., silicalite-1). Such zeolites do not have a net negative framework charge and therefore do not contain compensating cations. As a consequence, these zeolites have no ion exchange capacity, cannot be acidic, and exhibit a high degree of hydrophobicity. These highly siliceous zeolites are organophilic and have been used for the selective adsorption of volatile organic compounds. Zeolites with Si/Al ratios as low as 0.5 have also been made (e.g. bicchulite).

With zeolite membranes, separation is thought to occur through at least three different, nonexclusive mechanisms, which are based on differences in component diffusion, on molecular sieving or size exclusion, and on preferential adsorption. Thus, two or more different types of molecules may access the pore system of the zeolite membrane, but their diffusion rates through the pores may vary because each type of molecule interacts differently with the zeolite surface and pore structure. Additionally, molecular sieving may occur when one type of molecule can access the zeolite membrane pore system, but a different type of molecule cannot because of its larger size. Finally, the pore system of the zeolite membrane may preferentially adsorb a first molecule, which blocks entry of a second, different molecule into the pore system. Because molecules with different sizes and shapes have different diffusivities, high separation selectivities have been reported for n-$C_4H_{10}$/i-$C_4H_{10}$, and n-$C_6H_{14}$/3-methyl pentane mixtures. Likewise, high separation selectivities based on molecular sieving were obtained for $CH_4$/i-$C_8$, n-$C_6$/2,2 dimethylbutane, and p-/o-xylene mixtures. Selectivities have also been attributed to differences in adsorption properties.

It is important to recognize that adsorptive separation processes on granular molecular sieves are two-step batch processes involving successive adsorption and desorption of molecules. In contrast, membrane separations are continuous processes that are accomplished by applying a driving force across the membrane (e.g., pressure gradient, concentration gradient, or temperature gradient). Thus, membrane separations do not require regeneration of the active sites in the membrane by desorption. Instead, a vapor-phase feed stream is continuously applied to one side of the membrane while purified product is continuously removed from another (permeate) side of the membrane. Because zeolite membranes allow continuous separation of multi-component mixtures, they offer significant advantages over zeolite granules, including less capital expenditure for equipment and fewer processing steps.

Despite the perceived advantages of zeolite membranes, their use in separations and catalysis poses significant challenges. Because their ability to separate molecules depends on surface properties and pore structure, which can vary significantly among different types of zeolites, many zeolite membranes demonstrate limited selectivity for separating mixtures of molecular components. Previous attempts to improve membrane performance have met with limited success. For example, post-synthesis treatments such as CVD modification or coke deposition may block access to the zeolite pore system and/or reduce pore entrance diameters, thereby decreasing flux through the membrane.

Although the acid hydrogen form of zeolite membranes is useful for catalytic membrane reactors, synthesis of acidic zeolite membranes is a complex process. Conventional synthesis of acid zeolite membrane requires the use of alkali metal hydroxides. Subsequent steps involve acid treatment or ion exchange with an ammonium salt solution, followed by thermal decomposition of the ammonium ion to obtain the acid hydrogen form of zeolite membranes.

The present invention overcomes, or at least mitigates, one or more of the problems set forth above.

SUMMARY OF THE INVENTION

The present invention provides zeolite membranes that can be used to continuously separate components of mixtures. The zeolite membranes are prepared by isomorphous substitution, which allows systematic modification of the zeolite surface and pore structure. Through proper selection of the basic zeolite framework structure and compensating cations, isomorphous substitution permits high separation selectivity without many of the problems associated with zeolite post-synthesis treatments. The inventive method for preparing zeolite membranes is alkali-free and is much simpler than prior methods for making acid hydrogen zeolite membranes, which can be used as catalysts in membrane reactors.

To achieve the foregoing and other objects, one aspect of the present invention provides a membrane comprising a layer of an isomorphously substituted zeolite. The isomorphously substituted zeolite membrane can be represented by the formula:

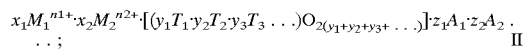

wherein $T_1$ is tetrahedrally coordinated Si, $T_2$ is a tetrahedrally coordinated element and is B, Ge, Ga or Fe or combinations thereof In addition, $T_3$ is tetrahedrally coordinated Al, $M_1$ and $M_2$ are compensating cations having valences n1 and n2, respectively, $A_1$ and $A_2$ are adsorbed species located within the zeolite, and $x_1$, $X_2$, $y_1$, $Y_2$, $Y_3$, $Z_1$, and $Z_2$ are stoichiometric coefficients. The present invention also contemplates an acid hydrogen form of the isomorphously substituted membranes having protons attached to the zeolite framework in lieu of inorganic compensating cations.

The membranes of the present invention can be used in numerous processes, including component separations based on at least one molecular property selected from size, shape, and polarity. In particular, the claimed membranes are capable of separating non-condensable gaseous mixtures, condensable organic vapors, water from a mineral acid solution, and one or more components of aqueous organic mixtures. In addition, some of the claimed membranes can be used to catalyze chemical reactions.

The surface properties and the pore structure of the zeolite membranes can be altered by appropriate selection of membrane components, allowing superior separations for a wide variety of mixtures. In one embodiment, the zeolite membrane is substantially free of alkali metal hydroxides. In another embodiment, $y_3$ is substantially equal to zero, and the zeolite membrane is substantially free of aluminum. The ratio of $T_1/T_2$ is generally between about 12 and about 600, and more typically, between about 12.5 and about 100.

Another aspect of the present invention provides an article of manufacture comprising a porous support and a membrane layer disposed on the porous support. The membrane layer comprises an isomorphously substituted zeolite having a composition that can be represented by formula II described above. The membrane may be substantially free of aluminum, with $y_3$ of formula II substantially equal to zero, and may be formed in-situ on and within the pores of the support. In one embodiment, the porous support has the form of a container, and the membrane is disposed on the interior surface of the container. Useful porous supports include tubes made of stainless steel, α-alumina, or β-alumina.

A further aspect of the present invention provides an apparatus for separating one or more components from a mixture. The apparatus includes at least one membrane unit, a device for introducing the multi-component mixture into the membrane unit, and a device for removing the components from the membrane unit. The membrane unit includes a porous support and a membrane layer disposed on the porous support. The membrane layer comprises an isomorphously substituted zeolite having a composition that can be represented by formula II. The apparatus may include a plurality of membrane units to enable rapid processing of large volumes of a multi-component feed.

Still another aspect of the present invention provides a method of making an isomorphously substituted zeolite membrane. The method includes preparing a porous support and contacting the porous support with an aqueous zeolite-forming gel. The gel is substantially free of alkali hydroxides and includes silica, a quaternary organic ammonium template, and a source of ions. Useful ions include $Al^{+3}$, $Ge^{+4}$, $Fe^{+3}$, $Ga^{+3}$ or $B^{+3}$ or combinations thereof. The method also includes heating the support and the gel to form (crystallize) a zeolite layer on the porous support, and calcining the zeolite layer to remove the template. The composition of the resulting zeolite layer can be represented by formula II.

In one embodiment of the method, the porous support is a container having at least one opening and an inner surface, and the gel is placed inside the container. During the heating step, additional gel may be placed in the container, and the container is sealed prior to heating. The heating step may be repeated one or more times to obtain a zeolite layer on the support that is substantially impermeable to nitrogen. Acidic ZSM-5 membranes can be obtained directly without additional steps involving ion exchange or acid treatment when the synthesis gel is substantially free of alkali metal hydroxides.

DETAILED DESCRIPTION

Figure 1:
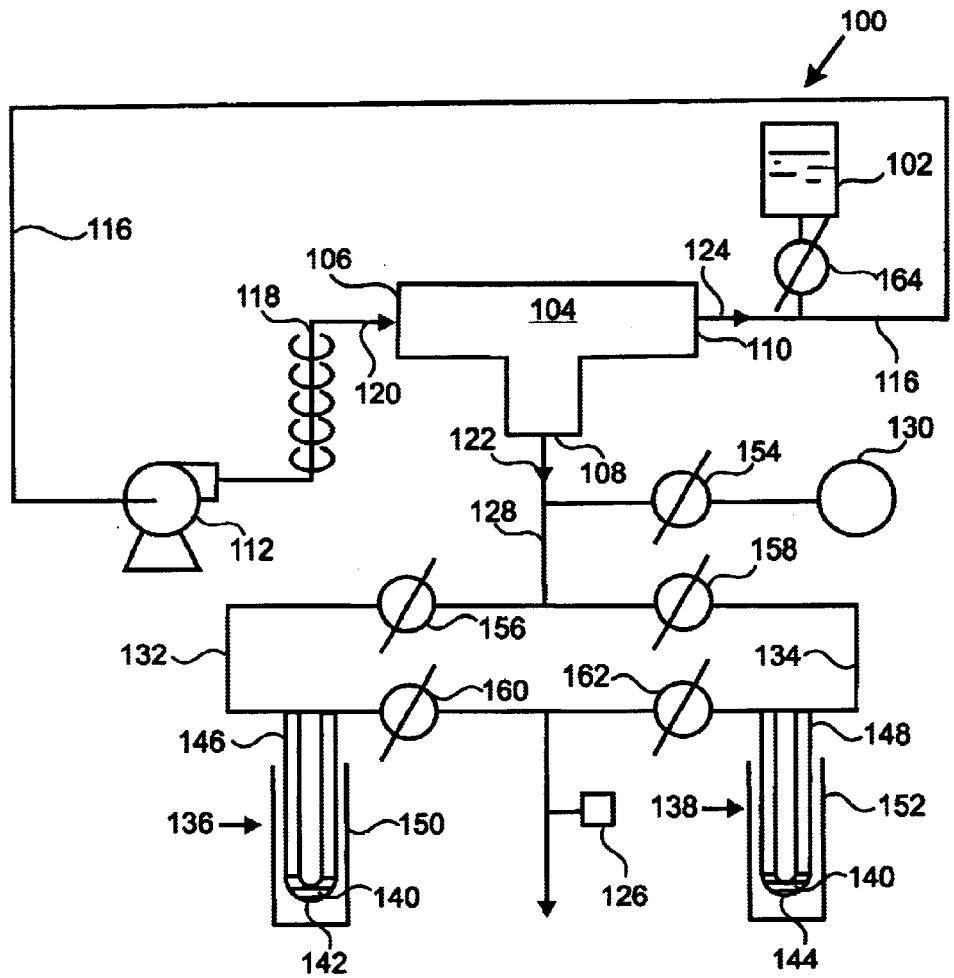
FIG. 1 schematically illustrates a useful system for separating components of a mixture.

FIG. 1 schematically illustrates a useful system 100 for separating one or more components of a condensed-phase mixture 102 using isomorphously substituted ZSM-5 zeolite membranes. Although the system 100 shown in FIG. 1 has been designed to separate components of liquid mixtures by pervaporation, it can be modified to separate mixtures comprised of vapor-phase components by vapor permeation as well (compare FIG. 5).

The system 100 includes a membrane module 104 having an inlet 106, a first outlet 108, and a second 110 outlet. A metering pump 112 drives the mixture 102 from a reservoir 114 to the membrane module 104 inlet 106 through a first conduit 116. A section 118 of the conduit 116 upstream of the membrane module 104 inlet 106 is optionally wrapped in heating tape to preheat the mixture 102. As described below, the membrane module 104 includes a zeolite membrane (not shown) that separates the feed stream 120 into a vapor-phase permeate stream 122—the portion of the feed stream 120 that passes through the zeolite membrane—and a liquid-phase retentate stream 124. The permeate 122 and the retentate 124 exit the module 104 through the first 108 and second 110 outlets, respectively. The retentate 124 returns to the reservoir 114 via the first conduit 116. Component concentrations in the feed 120 and the permeate 122 streams can be measured by gas chromatography (GC), high-pressure liquid chromatography (HPLC), or by GC and HPLC.

As can be seen in FIG. 1, a vacuum pump 126 communicates with the first outlet 108 of the membrane module 104 via a second conduit 128 and provides a pressure drop, which drives the permeate 122 through the zeolite membrane. An electronic gauge 130 monitors the pressure in the second conduit 128, which splits into a pair of conduits 132, 134 downstream of the pressure gauge 130. Each of the conduits 132, 134 thermally contacts separate cold traps 136, 138, which condense the permeate 122 flowing within the second conduit 128. As depicted in FIG. 1, condensed-phase permeate 140 collects in the bottoms 142, 144 of U-shaped tubes 146, 148 that are immersed in liquid nitrogen baths 150, 152. The U-shaped tubes 146, 148 comprise a portion of the permeate flow path between the first outlet 108 of the membrane module 104 and the vacuum pump 126. The system 100 also includes numerous valves 154,

156, 158, 160, 162, 164, which isolate the pressure gauge 130, the cold traps 136, 138, the vacuum pump 126, and the reservoir 114.

Prior to separation, the vacuum pump 126 evacuates the permeate 122 side of the membrane module 104. Once the permeate side 122 of the membrane module 104 reaches a desired vacuum level, e.g., about 200 Pa absolute pressure, the valve 162 closes the fluid connection between the vacuum pump 126 and the first outlet 108 of the membrane module 104. Because condensed-phase permeate 122 occupies little volume, the vacuum level, as indicated by the electronic pressure gauge 130, ordinarily should change little—a few hundred Pa, say—during a pervaporative separation. In some cases, however, non-condensable gases (e.g., nitrogen, oxygen, etc.) may enter the permeate 122 stream via the feed 120 stream or through leaks in the system 100. Over time, these gases may accumulate, reducing the vacuum level or increasing absolute pressure in the permeate side 122 of the membrane module 104. In such cases, the vacuum pump 126 and valve 162 can be cycled to remove the non-condensable gases.

Figure 2:
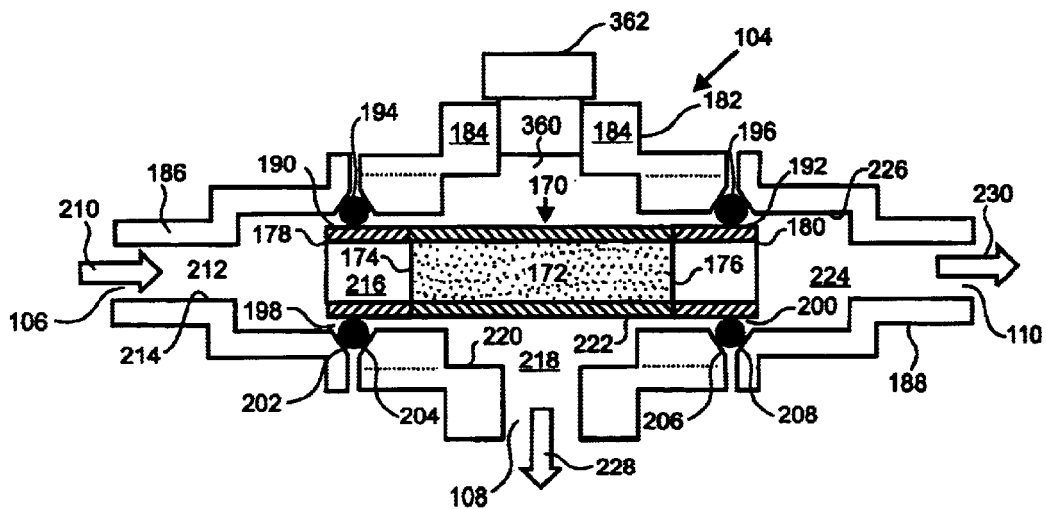
FIG. 2 shows a cross-sectional view of an embodiment of a membrane module.

FIG. 2 shows a cross-sectional view of an embodiment of the membrane module 104. The membrane module 104 includes a tubular membrane assembly 170, having an elongated, selectively permeable portion 172, which is connected at its ends 174, 176 to a pair of rigid, tubular end supports 178, 180. The membrane assembly 170 is retained within a shell 182 made of brass, stainless steel, or other rigid and chemically resistant material. The shell 182 includes a body portion 184 and a pair of removable end caps 186, 188. The end supports 178, 180 of the membrane assembly 170 are substantially impermeable to fluids. The end supports 178, 180 provide sealing surfaces 190, 192 for o-rings 194, 196 that are captured in grooves 198, 200 formed by opposing chamfered surfaces 202, 204, 206, 208 of the shell's 182 body portion 184 and end caps 186, 188, respectively. The o-rings can be made of any inert material, including silicone-based polymers, and fluorinated elastomers such as polytetrafluoroethylene (PTFE), vinylidenefluoride-hexafluoropropylene-tetrafluoroethylene terpolymer, and the like. Clamps, threaded fasteners, and the like (not shown) provide an axial compressive force sufficient to seal the o-rings 194, 196 against the shell 182 and the end supports 178, 180 of the membrane assembly 170.

As indicated by an arrow 210 shown in FIG. 2, during pervaporation the feed stream 120 enters the membrane module 104 through the inlet 108, and passes into a cavity 212 formed by an inner surface 214 of one of the end caps 186. From the cavity 212, the feed stream 120 enters an interior portion 216 of the membrane assembly 170. There, one or more feed 120 components flow radially through the selectively permeable portion 172 of the membrane assembly 170, as vapor, and collect in a cavity 218 formed by an inner surface 220 of the shell 182 and an outer surface 222 of the membrane assembly 170. Components that cannot pass through the selectively permeable portion 172 of the membrane assembly 170 remain in the liquid phase, and flow axially into a cavity 224 formed by an inner surface 226 of the second end cap 188. As shown by arrows 228, 230 the resulting permeate 122 and retentate 124 streams exit the membrane module 104 through the first 108 and second 110 outlets.

Figure 3:
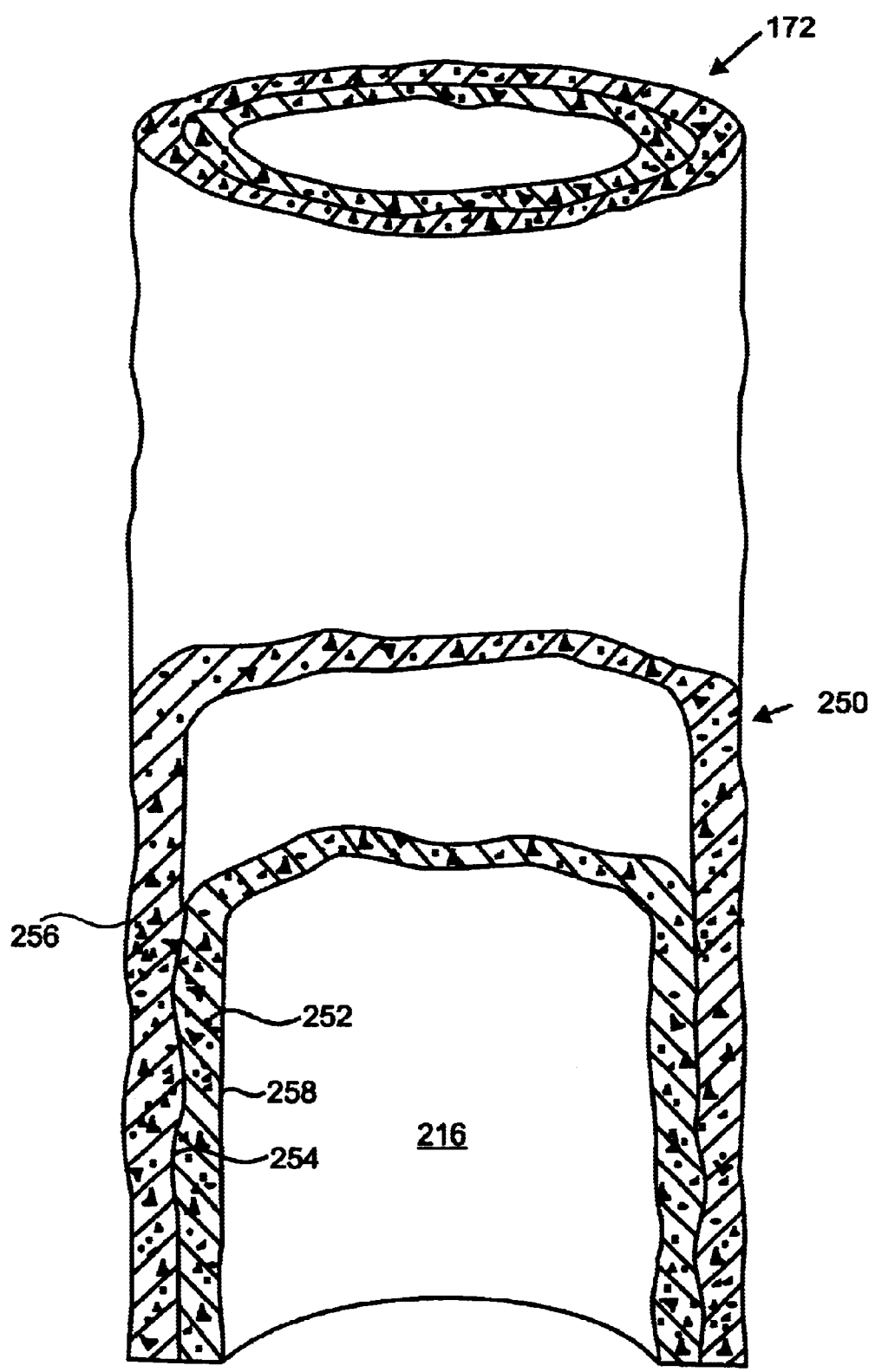
FIG. 3 shows a partial plan view of a selectively permeable portion of a membrane assembly.

FIG. 3 shows a partial plan view of the selectively permeable portion 172 of the membrane assembly 170. As can be seen in a cutaway 250 of the membrane assembly 170, the selectively permeable portion 172 includes a zeolite membrane 252 layer or film disposed on an inner surface 254 of a porous support 256 layer. An outer surface 258 of the membrane layer defines the interior portion 216 of the tubular membrane assembly 170. The porous support 256 should be able to carry the zeolite membrane 252 layer and should be able to resist chemical attack by the components of the feed stream 120. As described below, the porous support 256 should also be able to withstand reaction conditions during preparation of the zeolite membrane 252 layer. The porous support 252 typically has an average pore size similar to or larger than the pore size of the zeolite membrane 252 layer. Useful porous supports 256 include stainless steel, $\alpha$-$Al_2O_3$, $\gamma$-$Al_2O_3$, SiC, $SiN_3$, $SiO_2$, $TiO_2$, $ZrO_2$ and other inorganic oxides. Alumina supports are commercially available from a variety of vendors. Stainless steel supports are mechanically robust and are particularly useful for separating acidic mixtures because they can withstand attack by concentrated acids.

Although the membrane assembly 170 shown in FIG. 2 and FIG. 3 is generally cylindrical, the membrane assembly 170 can assume any convenient shape. For example, the membrane assembly 170 can comprise one or more planar layers, or can have a cross-section normal to the retentate flow that is generally oval or polygonal. Furthermore, the membrane module 104 shown in FIG. 1 may include more than one tubular membrane assembly 170, which can be connected in parallel to the feed 120, permeate 122, and retentate 124 streams.

The zeolite membrane 252 layer provides a semi-permeable barrier between the liquid-phase retentate 124 stream and the vapor-phase permeate 122 stream within the membrane assembly 170. As a "semi-permeable barrier," the zeolite membrane 252 layer is capable of selectively restricting the movement of molecules through the layer 252, which is essential to obtain an effective separation of the components of the feed stream 120 by pervaporation. The zeolite membrane 252 layer's ability to separate components of the feed stream 120 depends, at least in part, on the particular zeolite's pore system, surface properties, and hence chemical structure.

Useful zeolites include silicalite-1, ZSM-5, and zeolite analogues having a $SiO_2$ crystalline lattice in which one or more elements other than aluminum have been isomorphously substituted for some of the tetrahedrally coordinated $Si^{4+}$. These zeolite analogues can be represented by the formula:

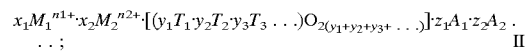

$$x_1M_1^{n1+} \cdot x_2M_2^{n2+} \cdot [(y_1T_1 \cdot y_2T_2 \cdot y_3T_3 \ldots)O_{2(y_1+y_2+y_3+\ldots)}]z_1A_1 \cdot z_2A_2 \cdot \ldots; \qquad \text{II}$$

where the expression in brackets corresponds to the framework composition and other terms represent species that reside in the pores of the framework structure. In formula II, $M_1$ and $M_2$ are compensating cations with valences n1 and n2, respectively; $T_1$, $T_2$, and $T_3$ are elements occupying the tetrahedral positions of the framework; $A_1$ and $A_2$ are adsorbed species located within the porous framework; and $x_1$, $x_2$, $y_1$, $Y_2$, $z_1$, and $z_2$ are stoichiometric coefficients. In general, the bracketed quantity will have a negative charge and $T_3$ is nonzero.

Because a metal or metalloid species (Me) has been isomorphously substituted into tetrahedral positions of the zeolite framework, it is more useful to describe the zeolites represented by formula II using a Si/Me ratio rather than a Si/Al ratio. Alternatively, this ratio can be expressed in accordance with formula II, above, as a $T_1/T_2$ ratio, where $T_1$ is Si and $T_2$ is B, Ge, Ga, Fe, or Al. Useful zeolites also include those having more than one isomorphously substituted element incorporated into the zeolite framework structure. Although zeolites traditionally have been defined to include only those aluminosilicates having an ordered, three-dimensional microporous structure, as used herein, the term "zeolite" also includes zeolite analogues having metals other than aluminum that are isomorphously substituted at the tetrahedral sites.

Isomorphous substitution has been shown to affect the surface properties and the pore structure of zeolites. For example, silicalite-1 and ZSM-5 have MFI structure, but silicalite-1 is composed of pure silica while ZSM-5 has aluminum substituted into a fraction of the silicon (tetrahedral) sites of the framework structure. It is known that silicalite-1 and ZSM-5 have different surface properties and pore structure due to changes in T—O—T bond angle and T—O bond length, where T represents Si or Al. Therefore, isomorphous substitution within the framework structure of silicalite-1 or ZSM-5 should also produce changes in T—O—T bond angle and T—O bond length, where T now represents Si, Al, Ge, B, Fe, or Ga. These changes should affect the surface properties and pore structure of the zeolite and the separation performance of the resulting zeolite membrane. Furthermore, with isomorphous substitution, the zeolite surface changes from hydrophobic (silicalite-1) to hydrophilic (ZSM-5) and from non-acidic (silicalite-1) to strongly acidic (ZSM-5). The Brönsted acid strength increases in the following order: silicalite-1, Ge-ZSM-5<B-ZSM-5<Fe-ZSM-5<Ga-ZSM-5<ZSM-5 (i.e., Al—ZSM-5). In acid-catalyzed reactions, the catalytic activity of isomorphously substituted zeolites should increase with Brönsted acid strength. Since reaction selectivity also depends on zeolite acid strength, the substituted zeolite membranes may be useful in catalytic membrane reactors.

Isomorphous substitutes of silicon must accept a tetrahedral coordination with oxygen. In addition to aluminum (cation radius of 0.051 nm), suitable substitutes (i.e., $T_2$, $T_3$, etc. in formula II) include boron (0.023 nm), iron (0.064 nm), germanium (0.053 nm), and gallium (0.062 nm). Among these elements, $Ge^{4+}$ has a diameter closest to those of $Si^{4+}$ (0.042 nm) and $Al^{3+}$ and thus substitutes more readily than other tetravalent ions. The $B^{3+}$ cation is much smaller than the other substituted cations, and it is less stable in the tetrahedral positions according to the Pauling Rule, which holds that cations are stable in the tetrahedral positions when the ratio of cation to oxygen radius is 0.225–0.425. Because of this instability, boron may be partially removed from the zeolite framework during preparation of the zeolite membrane layer 252 (i.e., during calcination). This extra-framework boron, which is located within the channels and on the external surface of zeolite, could affect membrane properties. Also, $Fe^{3+}$ may be difficult to incorporate into the zeolite framework because of its large diameter. Consequently, some extra-framework $Fe^{3+}$ may be present in the membrane as well. Other elements having similar cation radius and coordination requirements can also be isomorphously substituted into the zeolite structural framework.

Since Fe and B are trivalent, they create acid sites in the zeolite framework structure. In contrast, Ge is tetravalent and therefore does not create acid sites. Such differences in acidity may affect the permeability of the membrane. When boron is substituted into the silicalite-1 structure instead of aluminum, membranes can be prepared with Si/B ratios as low as about 12. In contrast, Al-ZSM-5 membranes are difficult to prepare with such low Si/Al ratios.

Figure 4:
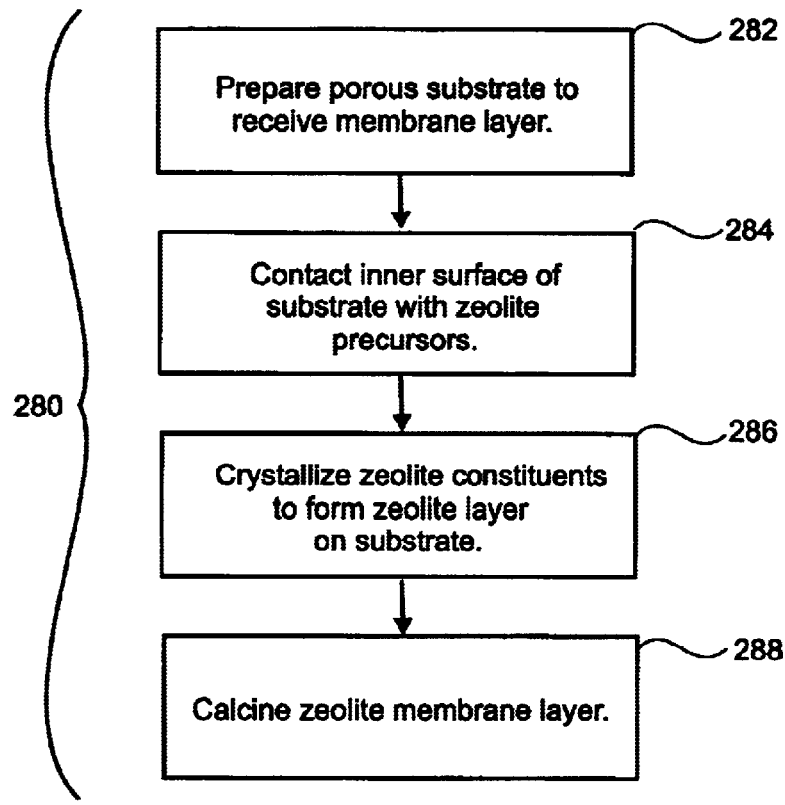
FIG. 4 shows a block diagram of a method of making a zeolite membrane layer through in-situ synthesis on an inner surface of a porous support.

Referring once again to the drawings, FIG. 4 shows a block diagram of a method 280 of making the zeolite membrane layer 252 of FIG. 3 through in-situ synthesis on the inner surface 254 of the porous support 256. The method 280 generally includes preparing 282 the porous support 256 to receive the membrane 252 layer. As described above, useful supports 256 include porous alumina and stainless steel tubes or containers. When using alumina supports 256, the ends 174, 176 of the alumina tubes are glazed to provide end supports 178, 180 and sealing surfaces 190, 192 (see FIG. 2). Likewise, when using stainless steel supports 256, non-porous stainless steel tubes are welded onto the ends 174, 176 of the porous stainless steel tubes to provide end supports 178, 180 and sealing surfaces 190, 192. In either case, prior to use, the support 256 is cleaned by brushing the inner surface 254 of the support 256, followed by immersing the support 256 in an ultrasonic bath of deionized water. The supports 256 are then boiled in distilled water and dried under vacuum with heating (at about 373 K for about 30 min).

As indicated in FIG. 4, the method 280 also includes contacting 284 an inner surface 254 of the support 256 with zeolite precursors. The zeolite precursors are provided as a synthesis gel comprised of silica, water, a source of metal ions (i.e., $Al^{3+}$, $B^{3+}$, $Ge^{4+}$, $Ga^{3+}$, $Fe^{3+}$, etc.), and optionally, an organic template, such as tetrapropyl ammonium hydroxide (TPAOH), tetrapropyl ammonium bromide (TPABr), tetrabutyl ammonium hydroxide (TBAOH), tetrabutyl ammonium bromide (TBABr), tetraethyl ammonium hydroxide (TEAOH) or tetraethyl ammonium bromide (TEABr) or combinations thereof. Referring to FIG. 2 and to FIG. 3, the synthesis gel is placed in the interior portion 216 of the tubular membrane assembly 170. The end supports 178, 180 are plugged with an inert material (e.g., PTFE) to form a container, and the gel is allowed to permeate the porous support 256. Ordinarily, the gel will thoroughly permeate the porous support 256 in less than 24 hours when held at a temperature up to about 318 K. When possible, template-free synthesis is used because it costs less, does not use toxic amines, and does not require calcining, which may introduce cracks or other structural defects in the zeolite membrane 252 layer.

As shown in FIG. 4, the method 280 also includes crystallizing 286 the zeolite constituents to form a zeolite layer on the support 256 and, optionally, calcining 288 the resulting zeolite layer to remove any organic residues, including the organic template. The tubular membrane assembly 170 is placed in an autoclave and heated at a temperature sufficient to induce zeolite formation, which is generally between about 403 K and about 469 K. During heating, water within the synthesis gel is forced out of the interior portion 216 of the membrane assembly 170 through the pores of the support 256, thereby forming a continuous zeolite layer on the inner surface 254 and within the pores of the support 256. The organic template molecules provided in the synthesis gel are trapped within the zeolite pore system and may also block larger cavities in the zeolite membrane 252 layer. Thus, prior to calcining 288, a zeolite membrane 252 layer without defects should be impermeable to gases, such as nitrogen, so that, as described below, vapor permeation measurements can be used to evaluate zeolite membrane 252 quality. Following crystallization 286, the uncalcined zeolite membrane 252 layer is washed with deionized water and dried at 383 K for at least 12 hours.

The contacting 284 and the crystallizing 286 steps (hydrothermal synthesis) can be repeated one or more times to ensure that the zeolite membrane 252 layer, after drying and before calcination, has the requisite quality. Following crystallization 286, the zeolite membrane 252 layer is calcined 288 to remove the organic template and any other residual organic material. The organic template must be removed from the zeolite pores to obtain open, micro-porous membranes. Calcining 288 generally comprises heating the zeolite membrane 252 layer at a prescribed rate until it reaches a desired temperature, e.g., about 750 K or higher. This temperature is maintained for a sufficient amount of time, e.g., about eight hours or more, to thermally decompose any organic material. Following thermal decomposition, the zeolite membrane 252 is cooled at a prescribed rate to minimize thermal stresses in the zeolite layer. Ideally, the temperature profile is carefully controlled to ensure uniform heating and cooling within the zeolite membrane 252 layer. Although uniform heating and cooling is generally best achieved using relatively low temperature ramping (~1 K/min), the method 280 may employ higher heating rates as long as care is taken to minimize local overheating. Local overheating may result in partial degradation of the zeolite crystal structure and/or steam generation, which can cause siloxane bond hydrolysis and/or loss of aluminum from the zeolite framework.

The zeolite membranes 252 of FIG. 3 can be characterized using many different techniques. For example, the membranes 252 can be characterized by X-ray diffraction (XRD) analysis of zeolite powder residue sampled from the interior 216 of the membrane assembly 170 (FIG. 2) following hydrothermal synthesis. This technique avoids destroying the membranes 252, and assumes that the zeolite membrane 252 layer and zeolite powder samples have the same crystal structure. A useful apparatus for performing XRD measurements includes a Scintag PAD-V diffractometer, which uses a diffracted beam monochromator and a line-source X-ray beam of Cu K$\alpha$ radiation from a standard 2 kW sealed tube. The X-rays are counted using a standard scintillation detector. Individual samples are ground to a fine powder and dispersed on a glass slide or packed into a cavity mount. The scan range (2$\theta$) is typically between about 2° and 50°, and phases are identified by comparing scattered intensity peaks with a library of known inorganic compounds. A useful library of approximately 20,000 inorganic compounds is available in a computer-readable format from the International Center of Diffraction Data. Peak intensities and angles may also be calculated from crystal structure data, if known.

The zeolite membranes 252 can also by characterized by pervaporating compounds of known sizes through the membrane 252 layer using the system 100 shown in FIG. 1. Useful compounds include 2,2-dimethylbutane (DMB), which has a kinetic diameter (0.62 nm) that is larger than the XRD pore diameter of the MFI structure. Other useful compounds include o-xylene, p-xylene, benzene, tri-isopropyl benzene (TIPB), which have kinetic diameters of 0.685 nm, 0.585 nm, 0.585 nm, and 0.85 nm, respectively. Xylene isomers are challenging to separate because they have similar physical properties.

Figure 5:
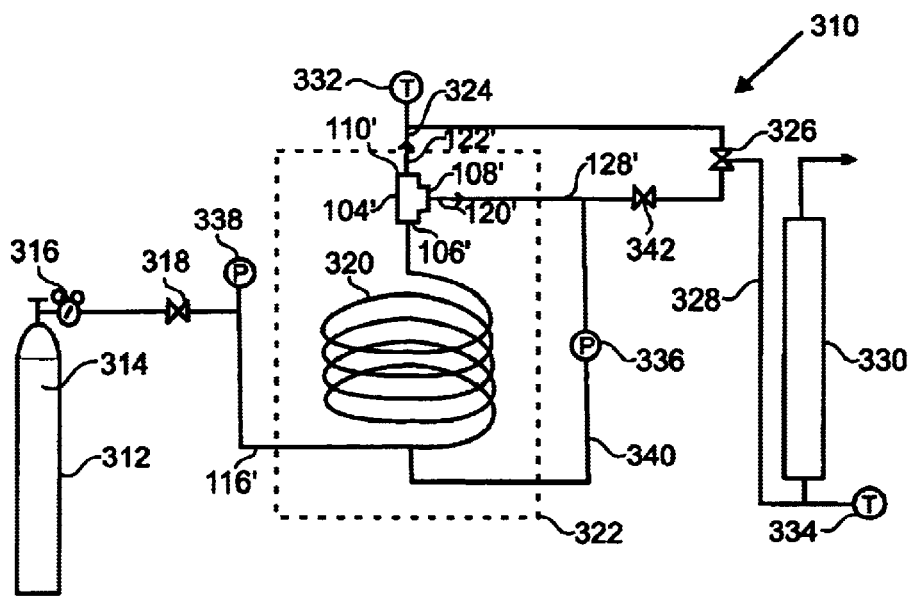
FIG. 5 shows a schematic view of an apparatus that can be used to characterize zeolite membranes by measuring single-gas and/or multi-gas permeation rates at various temperatures.

FIG. 5 shows a schematic view of an apparatus 310 that can be used to characterize zeolite membranes 252 by measuring single-gas permeation rates at various temperatures. As described below, with simple modification the apparatus 310 can also be used to measure multi-gas permeation rates. The vapor permeation apparatus 310 is similar to the pervaporation system 100 shown in FIG. 1, and includes a membrane module 104' having an inlet 106', a first outlet 108', and a second 110 outlet'. A pressurized source 312 of gas 314 ($H_2$, He, $CO_2$, $N_2$, $n-C_4H_{10}$, $i-C_4H_{10}$, etc.) enters the membrane module 104' inlet 106' through a first conduit 116'. A pressure regulator 316 and valve 318 located along the first conduit 116', downstream of the source 312, provide coarse control of the gas 314 flow rate. The first conduit 116' is made of a material having good thermal conductivity (e.g., stainless steel), and a section 320 of the first conduit 116' upstream of the membrane module 104' inlet 106' is coiled to increase heat transfer area. A temperature-controlled oven 322 encloses the membrane module 104' and the coiled section 320 of the first conduit 116', and provides substantially isothermal conditions within the module 104' during permeation measurements.

As described above, the membrane module 104' contains a tubular membrane assembly 170 (FIG. 2), which includes a zeolite membrane 252 layer and a porous support 256 layer (FIG. 3) that define a side wall portion of the assembly 170. Generally, a portion of the gas 314 entering the membrane module 104' passes radially through the zeolite membrane 252 and the porous support 256, and exits the module 104' through the first outlet 108'. The remainder of the gas 314 passes axially through the interior 216 of the membrane assembly 170, and exits the module 104' via the second outlet 110'. Second 128' and third 324 conduits channel the resulting permeate 120' and retentate 122' streams, respectively, away from the membrane module 104'. The second 128' and third 324 conduits converge at a two-way purge valve 326, which allows venting of the permeate 120' stream or the retentate 122' stream through a common exhaust line 328 and a bubble flow meter 330.

As shown in FIG. 5, the apparatus 310 may include temperature and pressure sensors. The embodiment shown in FIG. 5 includes first 332 and second 334 thermocouples that are located in the second outlet 110' of the membrane module 104' and in the common exhaust line 328, respectively. A controller (not shown), which communicates with the first thermocouple 332, compares the temperature in the membrane module 104' with a desired set point, and adjusts the temperature of the oven 322 in response to any offset. The embodiment also includes first 336 and second 338 pressure sensors that are located, respectively, in a pressure line 340 that communicates with the first conduit 116' and the second conduit 128', and in the first conduit 116' immediately down stream of the pressure regulator 316 and valve 318. The first pressure sensor 336 is a differential pressure gauge that senses pressure differences between the gas entering the membrane module 104' and the pressure of the gas in the permeate 120' stream. To maintain a desired pressure drop across the membrane module 104, the apparatus 310 includes a pressure regulator 342 (i.e., variable flow area valve) that communicates with the first pressure sensor 336, and adjusts the flow rate of the gas permeate through second conduit 128'.

During a permeation measurement, gas 314 flow through second outlet 110' is stopped at the two-way purge valve 326, so that all of the gas 314 entering the membrane module 104' passes through the zeolite membrane 252 layer and porous substrate 256 of the membrane assembly 170. The resulting gas 314 flow rate through the zeolite membrane 252 layer is measured using the bubble flow meter 330. In most of the gas permeation experiments, the pressure regulator 342 maintains a 138 kPa pressure drop across the membrane module 104'. Single gas permeation rates are usually measured at two or more temperatures, e.g., at 300 K and 473 K.

With simple modification, the vapor permeation apparatus 310 shown in FIG. 5 can also be used to measure multi-gas permeation rates. For example, the apparatus 310 may include one or more metering pumps (e.g., syringe pumps) that communicate with the first conduit 116'. During a measurement, the metering pump injects a liquid-phase mixture into a pre-heated carrier gas (e.g., He) flowing within the first conduit 116'. The liquid mixture vaporizes in the hot carrier gas, which transports the gas mixture into the membrane module 104' inlet 106'. A portion of the gas mixture entering the membrane module 104' passes radially through the zeolite membrane 252 (FIG. 3) and the porous support 256, and exits the module 104' through the first outlet 108'. The remainder of the gas 314 passes axially through the interior 216 of the membrane assembly 170, and exits the module 104' via the second outlet 110'. Second 128' and third 324 conduits channel the permeate 120' and retentate 122' streams, respectively, away from the membrane module 104'.

In contrast to single-gas permeation measurements, the second 128' and third 324 conduits do not converge at the two-way purge valve 326 of FIG. 5, but instead vent through separate exhaust lines and bubble flow meters. As described above, the pressure regulator 342 can be used to impose a desired pressure drop across the membrane module 104', which drives diffusion through the selectively permeable portion 172 of the membrane assembly 170 (FIG. 2). Alternatively or additionally, the apparatus 310 may employ a sweep gas (e.g., He, Ar, etc.) to generate a concentration gradient across the selectively permeable portion 172 of the membrane assembly 170. The sweep gas enters a cavity 218 formed by an inner surface 220 of the shell 182 and an outer surface 222 of the membrane assembly 170 through a port 360 in a body portion 184 of the shell 182. Note that the port 360 shown in FIG. 2 is sealed with a removable plug 362.

The disclosed isomorphously substituted zeolite membranes will find use in many different processes. For example, the membranes can be used to separate non-condensable gases. The thermal stability of the disclosed zeolite membranes makes them ideal for separating non-condensable gases, which are often available at high temperature. For example, the isomorphously substituted zeolite membranes of the invention could be used to separate $H_2$ from $CO_2$ in the water-gas shift reaction.

The membranes can also be used to separate condensable organic vapor mixtures. The separation of condensable organic vapors often involves separating isomers that have similar relative vapor pressures. Typically, these separations are carried out using multiple distillation columns, require hundreds of stages, and are energy intensive. Isomorphously substituted zeolite membranes provide a much simpler, and less energy intensive separation process. For instance, as described below in Example 4 and Example 7, the membranes of the invention have been used to separate n-$C_4H_{10}$/i-$C_4H_{10}$ mixtures and mixtures of xylene isomers, respectively.

The removal of organic compounds or water from aqueous solutions is important for recovering valuable organic products from process streams, for recycling process water, and for treating wastewater. The disclosed hydrophobic or organophilic membranes can be used to separate such organic/water mixtures by pervaporation using the apparatus shown in FIG. 1. The hydrophobic, isomorphously substituted Ge-ZSM-5 membranes possess a different pore structure than silicalite-1 membranes previously used for separating organic/water mixtures, and thus have different permeation and adsorption properties. These membranes may be able to separate organic compounds from water with greater selectivity than previously studied silicalite-1 membranes.

Because of their acid resistance, the disclosed isomorphously substituted zeolite membranes may also be used to separate mineral acids from water by pervaporation. Furthermore, the ability to vary the Brönsted acid strength of the disclosed membranes should prove useful in acid separations since water adsorption will likely vary with the number of acidic sites within the framework structure and on the membrane surface.

The disclosed isomorphously substituted zeolite membranes can also be used in catalytic membrane reactors. Zeolite membranes have many properties that make them particularly useful as catalysts. First, it is possible to introduce a large variety of cations, including protons, having different catalytic properties into the zeolite pore system. Second, zeolites exhibit a molecular sieving effect because of their ability to selectively adsorb molecules whose dimensions are below a certain critical size into their pore system. In shape-selective catalysis, the molecular pore structure and the presence of catalytically active sites is exploited to control reaction selectivity—i.e., to accelerate one of many potential reaction pathways. For example, ZSM-5 zeolites are used as shape selective catalysts in the conversion of methanol to gasoline and in the conversion of benzene and ethylene to ethyl benzene. Generally, the catalytic activity and selectivity of zeolites depend on Brönsted acid strength. Since it is possible to prepare membranes with different Brönsted acid strengths and with different numbers of acidic sites, it may be possible to tailor the catalytic activity and the selectivity of the disclosed membranes. Finally, the disclosed method of preparing zeolite membranes allows for direct synthesis of the acid hydrogen form of the zeolite, which is much simpler than known synthesis techniques.

EXAMPLES

The following examples are intended as illustrative and non-limiting and represent specific embodiments of the present invention.

Example 1

Isomorphously Substituted Zeolite Synthesis

Zeolite membranes are prepared by in situ crystallization from zeolite forming gels (zeolite precursors) on three types of porous support tubes. The support tubes (OD=1.0 cm) comprise α-alumina with an inner layer of γ-alumina having 5-nm diameter pores (0.70 cm ID, U.S. Filter), α-alumina with an inner layer of α-alumina having 200-nm diameter pores (0.70 cm ID, U.S. Filter), or porous stainless steel with an inner layer of stainless steel having 500-nm diameter pores (0.65 cm ID, Mott Metallurgical Co.).

Alkali-free zeolite forming gels are prepared using silica sol (Ludox AS40) as the silicon source. Other silicon sources such as tetraethyl-orthosilicate or fumed silica (Aeorsil-200) can also be used. A quaternary organic ammonium template, tetrapropyl ammonium hydroxide (TPAOH) is used to help stabilize and direct zeolite formation. Other quaternary ammonium compounds such as tetrapropyl ammonium bromide (TPABr), tetrabutyl ammonium hydroxide (TBAOH), tetrabutyl ammonium bromide (TBABr), tetraethyl ammonium hydroxide (TEAOH), tetraethyl ammonium bromide (TEABr) could also be used as templates. For isomorphously substituted zeolite gels, Al(i-$C_3H_7O)_3$, Ge($C_2H_5$O)$_4$, Fe(NO$_3$)$_3$, and/or B(OH)$_3$ are added synthesis solution, which is then stirred for at least five minutes. Other solutions containing ionic $Al^{+3}$, $Ge^{+4}$, $Fe^{+3}$, $Ga^{+3}$, or $B^{+3}$ could also be used. In some cases, the zeolite forming gel also contains sodium hydroxide.

The isomorphously substituted zeolite membranes containing B, Fe, Ge, Ga, and Al are prepared by in-situ crystallization on porous supports. Tubular supports 2.8 cm in length are used because they are commercially available and because they are well adapted for growing continuous films. One end of each tube is plugged with a polytetrafluoroethylene (PTFE) cap to form a container. A zeolite forming gel comprising silica, water, TPAOH, and a source of boron, aluminum, germanium, and/or iron is placed inside the porous support container. The other end of the tube is plugged, and the container is left for periods up to 24 hours at room temperature. During this time, the porous support soaks up almost all of the synthesis gel. The container is again filled with gel, plugged, and placed in an autoclave to allow the gel to crystallize. The first crystallization is carried out hydrothermally at 458° K for 24 hours. When the capped container is heated, water within the gel is forced to permeate through the pores of the support container, thereby forming a continuous zeolite layer on the inner wall of the support container.

A synthesis using the same procedure but conducted at 453 K for 48 hours is repeated until an uncalcined membrane, after drying at 373 K, is impermeable to $N_2$ for a 138 kPa pressure drop at room temperature. After zeolite synthesis is complete, the membranes are washed, dried and calcined to remove the organic template molecules from the zeolite pores. A computer-controlled muffle furnace with heating and cooling rates of 0.6 and 1.1 K/minute, respectively, is used for calcining the membranes. The maximum calcination temperature is 753° K, and the membrane is held there for eight hours and then stored at room temperature under vacuum.

A series of isomorphously substituted zeolite membranes having Si/Me ratios of 100 was prepared using zeolite forming gels and synthesis conditions listed in Table 1. Each of the membranes was prepared on porous stainless steel supports. Because $Fe^{3+}$ can be difficult to incorporate into the zeolite framework because of its large diameter, some extra-framework $Fe^{3+}$ could be present within the membrane. However, the Fe-ZSM-5 membrane was prepared from a brown solution, but after synthesis, the membrane was white, and it remained white after calcination. This indicates that $Fe^{3+}$ cations were likely incorporated into the framework positions; membranes containing extra-framework $Fe^{3+}$ are expected to be brown.

TABLE 1

Molar Compositions of Zeolite Precursors and Synthesis Conditions for Preparing Isomorphously Substituted Zeolite Membranes with Si/Me = 100

| Membrane | TPAOH | Metal | SiO$_2$ | H$_2$O | Crystallization Time (h) @ Temp. (K.) | # Layers |
|---|---|---|---|---|---|---|
| silicalite-1 | 1.0 | 0 | 19.5 | 438 | 48 @ 458 | 2 |
| Al-ZSM-5 | 1.5 | 0.195 | 19.5 | 438 | 48 @ 458 | 2 |
| Fe-ZSM-5 | 1.5 | 0.195 | 19.5 | 438 | 48 @ 458 | 2 |
| B-ZSM-5 | 1.5 | 0.195 | 19.5 | 438 | 48 @ 458 | 2 |
| Ge-ZSM-5 | 1.0 | 0.195 | 19.5 | 438 | 24 @ 458 | 4 |

A second series of isomorphously substituted membranes having Si/Me ratios ranging between 12 and 600 was prepared from the synthesis gels listed in Table 2. The preparation conditions for these membranes are described in Table 3.

TABLE 2

Molar Compositions of Synthesis gels for B-ZSM-5 and Al-ZSM-5 Zeolite Membranes

| Membrane | TPAOH | SiO$_2$ | B(OH)$_3$ | H$_2$O | NaOH | Al$_2$O$_3$ | Si/Me |
|---|---|---|---|---|---|---|---|
| M1 | 2.0 | 19.46 | 0.39 | 438 | 2.0 | 0.0 | 50 |
| M2 | 2.0 | 19.46 | 0.778 | 500 | 2.5 | 0.0 | 25 |
| M3 | 2.0 | 19.46 | 1.62 | 500 | 3.0 | 0.0 | 12 |
| M4, M4a, M4b, M7 | 1.55 | 19.46 | 0.195 | 438 | 0.0 | 0.0 | 100 |
| M5, M8 | 2.22 | 19.46 | 0.778 | 500 | 0.0 | 0.0 | 25 |
| M6, M9 | 4.44 | 19.46 | 1.55 | 500 | 0.0 | 0.0 | 12.5 |
| M10 | 1.0 | 19.46 | 0.0 | 438 | 0.0 | 0.0 | ∞ |
| M11, M12 | 1.0 | 19.46 | 0.0 | 438 | 0.0 | 0.0162 | 600 |

TABLE 3

Membrane Preparation Conditions for Molar Compositions shown in Table 2.

| Membrane | Support | Crystallization Time (h) @ Temperature (K.) | # Layers |
|---|---|---|---|
| M1 | stainless | 48 @ 458 | 4 |
| M2 | stainless | 24 @ 458 | 4 |
| M3 | stainless | 24 @ 458 | 5 |
| M4, M4a, M4b | stainless | 48 @ 458 | 2 |
| M5 | stainless | 24 @ 458 | 4 |
| M6 | stainless | 24 @ 458 | 5 |
| M7 | α-alumina | 48 @ 458 | 2 |
| M8 | α-alumina | 24 @ 458 | 4 |
| M9 | α-alumina | 25 @ 458 | 5 |
| M10 | stainless | 48 @ 458 | 2 |
| M11 | stainless | 48 @ 458 | 2 |
| M12 | α-alumina | 48 @ 458 | 2 |

Example 2

ZSM-5 Zeolite Structural Confirmation

MFI-type zeolites, such as silicalite-1 (pure silica) and ZSM-5 (containing an isomorphously substituted element) have the same structure with XRD pore dimensions of 0.53 nm×0.56 nm. To confirm the MFI-structure of the membranes prepared in Example 1, XRD powder patterns were obtained for crystalline powders that were formed at the same time as the membranes. This procedure avoids destroying the membranes; the membranes and powders were assumed to have the same crystal structure. For all powders, the positions and the intensities of the diffraction peaks were identical to those reported for the MFI-structure. No additional peaks were observed, indicating that the powders had the pure MFI structure.

A Scintag PAD V automated powder diffraction unit using a diffracted beam monochromator and a line-source X-ray beam of Cu K-series radiation from a standard 2 kW sealed tube was used to characterize these crystals. The X-rays were counted using a standard scintillation detector. Each sample was ground to a fine powder and dispersed on a glass slide or packed into a cavity mount. For phase identification, the scan range was typically 2° to 50° 2θ. Phase identification was based on comparison of scattered intensity peaks with a standard file of approximately 20,000 known inorganic compounds. The standard file was provided by International Center of Diffraction Data (ICDD) (12 Campus Blvd, Newtown Square, Pa. 19073). Peak intensities and angles may also be calculated from crystal structure data, if known.

Additionally, the structure of membrane M4 of Table 2 was broken and characterized by XRD using the Scintag PAD V automated powder diffraction unit. The sample tube was cut lengthwise and placed in a specially made sample holder so that the membrane was in the correct center position of the diffraction instrument. The spot-source beam was collimated so that only the portion of the tube in the correct position was exposed to the radiation. The positions and the intensities of all peaks in the XRD pattern for the boron-containing zeolite membrane M4 were also in agreement with those reported for MFI zeolite.

Membranes prepared in accordance with the invention on α-alumina supports were also characterized by SEM. The SEM micrographs clearly show the presence of zeolite crystals on the alumina support. SEM photographs were obtained with an ISI-SX-30 scanning electron microscope. Cylindrical membranes were broken and fragments selected as samples. Photographs were taken of the cross section and inner surface to show the structure and morphology of the membrane.

Example 3

Inductively Coupled Plasma Experiments

The boron content of the B-ZSM-5 membranes prepared in Example 1 was verified by inductively coupled plasma after first dissolving the crystals in hydrofluoric acid. The Si/B ratios in the zeolite powders were determined to be similar to those in the zeolite forming gels. For example, zeolite powders formed from a gel having a Si/B molar ratio of 50 were found to have actual Si/B molar ratios of about 60.

Example 4

Single Gas and Mixture Permeation Experiments

Single-gas permeation rates of $H_2$, $N_2$, and $CO_2$ were measured over a range of temperatures for most of the B-ZSM-5 membranes of Example 1, as well as the Fe-ZSM-5, Ge-ZSM-5, Al-ZSM-5 and silcalite-1 membranes of Example 1. In addition, single-gas and mixture permeances of n-$C_4H_{10}$ and i-$C_4H_{10}$ were measured for all of the membranes shown in Table 1–Table 3 over the same temperature range. The single-gas permeation rates were measured by sealing the membrane in a stainless steel module with silicone o-rings in a dead end mode. The pressure drop across the membrane was 138 kPa, and the permeate side pressure was 83 kPa. The ratio of single-gas permeances is referred to as the ideal selectivity.

Mixture permeances were measured in a continuous-flow stainless module, using He as a sweep gas. A 50/50 mixture of n-$C_4H_{10}$ and i-$C_4H_{10}$, with a total flow rate of 40 $cm^3$/minute, flowed axially inside of the tube, and the permeate diffused radially outward. Silicone o-rings were used to seal the membrane inside the module. The module as wrapped in heating tape and insulation. A temperature controller maintained the desired temperature based on a thermocouple placed at the axial outlet of the membrane. The permeate stream and the retentate stream were analyzed using a HP 5890 gas chromatograph with a TC detector and a packed column (1% Alltech AT-1000 on Graph-GC). Each permeance was calculated from an average of four samples taken from the permeate and retentate streams. The calculated concentrations from the four samples at a given set of conditions typically varied less than 2%. The volumetric flow rates of retentate stream and the permeate stream were measured at room temperature and atmospheric pressure using soap-film flow meters. In Table 4, the n-$C_4H_{10}$/i-$C_4H_{10}$ separation selectivities are the ratios of permeances, and the log-mean partial pressure was used for this calculation.

Figure 6:
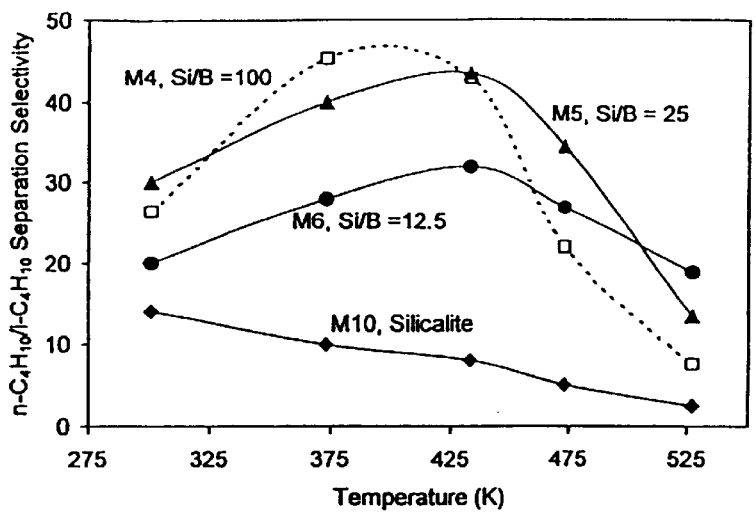
FIG. 6 shows $n$-$C_4H_{10}$/$i$-$C_4H_{10}$ separation selectivity as a function of temperature for three B-ZSM-5 membranes on stainless steel supports with different Si/B molar ratios as indicated and for a silicalite-1 membrane on a stainless steel support.
Figure 7:
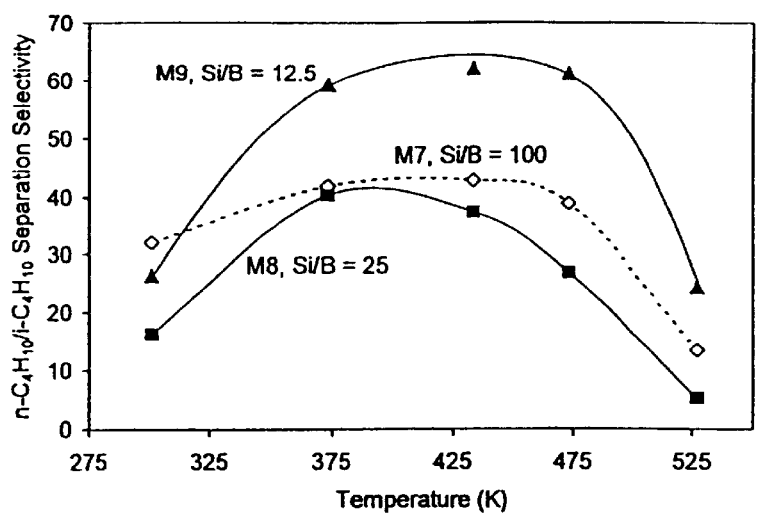
FIG. 7 shows $n$-$C_4H_{10}$/$i$-$C_4H_{10}$ separation selectivity as a function of temperature for three alkali free B-ZSM-5 membranes on α-alumina supports with different Si/B molar ratios as indicated.

Results of the permeation experiments are shown in Table 4 and FIG. 6–FIG. 12. Table 4 shows single gas permeances and n-$C_4H_{10}$ and i-$C_4H_{10}$ selectivities for B-ZSM-5 membranes that were prepared under different conditions and that have various Si/B molar ratios. FIG. 6 and FIG. 7 demonstrate the influence of boron substitution and support composition on separation performance. FIG. 6 shows n-$C_4H_{10}$/i-$C_4H_{10}$ separation selectivity as a function of temperature for three B-ZSM-5 membranes (M4–M6) on stainless steel supports with different Si/B molar ratios (100, 25, 12.5) and for a silicalite-1 membrane on a stainless steel support. Similarly, FIG. 7 shows n-$C_4H_{10}$/i-$C_4H_{10}$ separation selectivity as a function of temperature for three alkali free B-ZSM-5 membranes (M7–M9) on α-alumina supports with different Si/B molar ratios (100, 25, 12.5).

Figure 8:
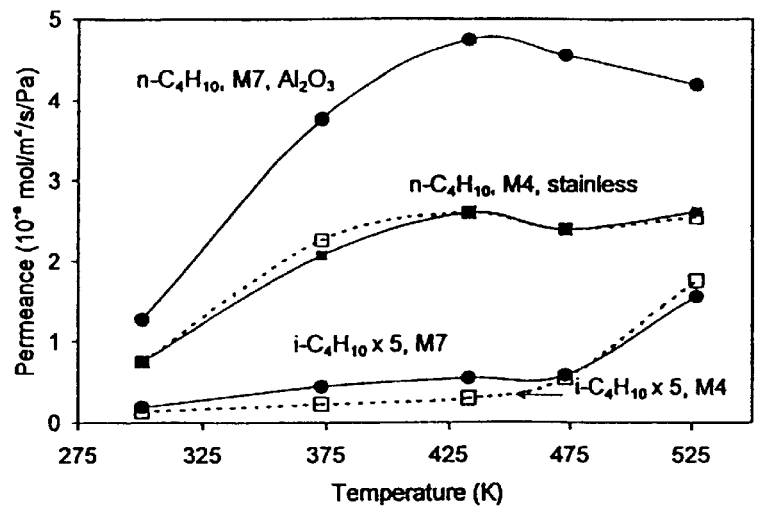
FIG. 8 shows $n$-$C_4H_{10}$/$i$-$C_4H_{10}$ mixture permeance as a function of temperature for two alkali free B-ZSM-5 membranes on stainless steel and α-alumina supports; both membranes have Si/B molar ratios of 100.

FIG. 8 compares n-$C_4H_{10}$/i-$C_4H_{10}$ mixture permeation rate as a function of temperature for two alkali free B-ZSM-5 membranes (M4, M7) prepared on stainless steel (M4) and α-alumina (M7) supports. Both membranes have Si/B molar ratios of 100. To study membrane stability, n-$C_4H_{10}$/i-$C_4H_{10}$ mixture permeation rates were measured twice for the M4 membrane. Broken lines show the second set of permeation rate measurements, which were taken about 48 hours after the first set of permeation rate measurements.

Figure 9:
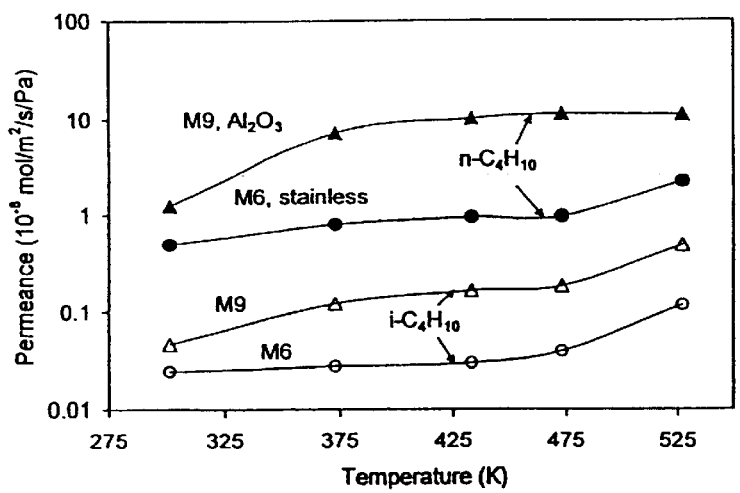
FIG. 9 shows $n$-$C_4H_{10}$/$i$-$C_4H_{10}$ mixture permeance as a function of temperature for two alkali free B-ZSM-5 membranes on stainless steel and α-alumina supports as indicated; each membrane has a Si/B molar ratio of 12.5.
Figure 10:
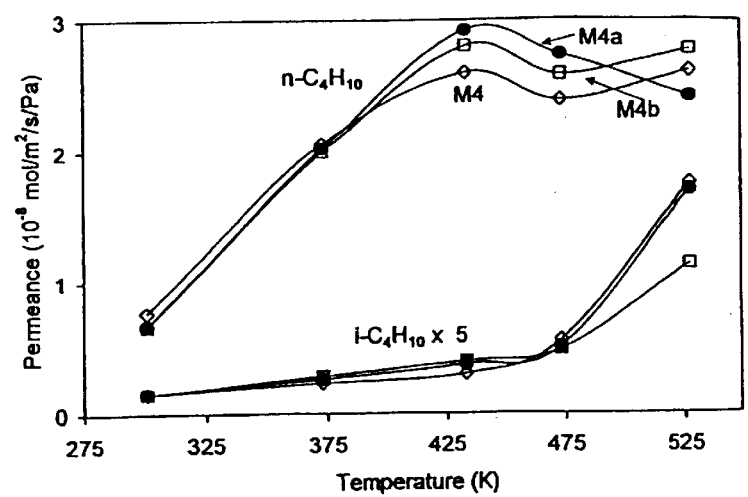
FIG. 10 shows $n$-$C_4H_{10}$/$i$-$C_4H_{10}$ mixture permeance as a function of temperature for three alkali free B-ZSM-5 membranes prepared under identical conditions on stainless steel supports; each membrane has a Si/B molar ratio of 100.

FIG. 9 and FIG. 10 demonstrate the influence of support composition and batch to batch variability on separation performance. FIG. 9 shows n-$C_4H_{10}$/i-$C_4H_{10}$ mixture permeance as a function of temperature for two alkali free B-ZSM-5 membranes on stainless steel (M6) and α-alumina (M9) supports. Each membrane has a Si/B molar ratio of 12.5. FIG. 10 shows n-$C_4H_{10}$/i-$C_4H_{10}$ mixture permeance as a function of temperature for three alkali free B-ZSM-5 membranes (M4*a*, M4*b*, M4*c*) prepared under identical conditions (Si/B molar ratio of 100) on stainless steel supports.

Figure 11:
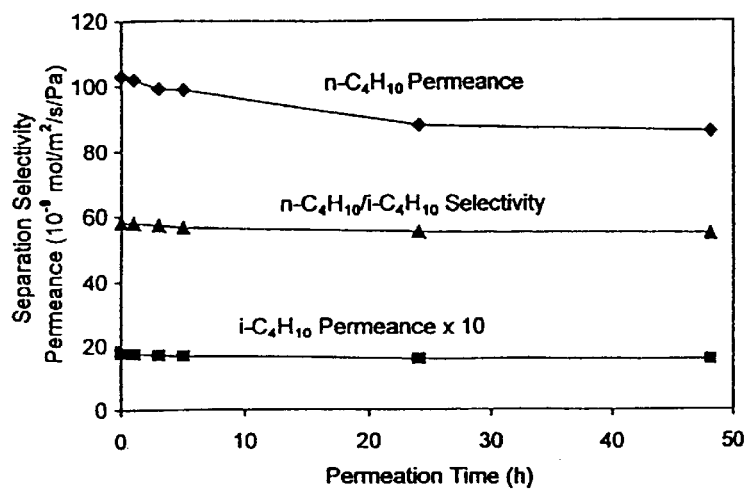
FIG. 11 shows $n$-$C_4H_{10}$/$i$-$C_4H_{10}$ mixture permeance and separation selectivity as functions of time for an alkali free B-ZSM-5 membrane prepared on an α-alumina support and having a Si/B molar ratio of 12.5; measurements were taken at 473 K.

FIG. 11 demonstrates stability of an alkali free B-ZSM-5 membrane during an extended permeation experiment. FIG. 11 shows n-$C_4H_{10}$/i-$C_4H_{10}$ mixture permeance and separation selectivity as functions of time for B-ZSM-5 membrane M9, which was prepared on an α-alumina support and had a Si/B molar ratio of 12.5. All of the measurements were made at 473 K. As shown in FIG. 11, the i-$C_4H_{10}$ permeance decreased approximately 2% in 48 hours, whereas the n-$C_4H_{10}$ permeance decreased by about 10% during the initial 24 hours of the experiment and was almost constant during the next 24 hours. The separation selectivity decreased from 59 to 56 after 42 hours. There was no evidence of butane decomposition.

Figure 12:
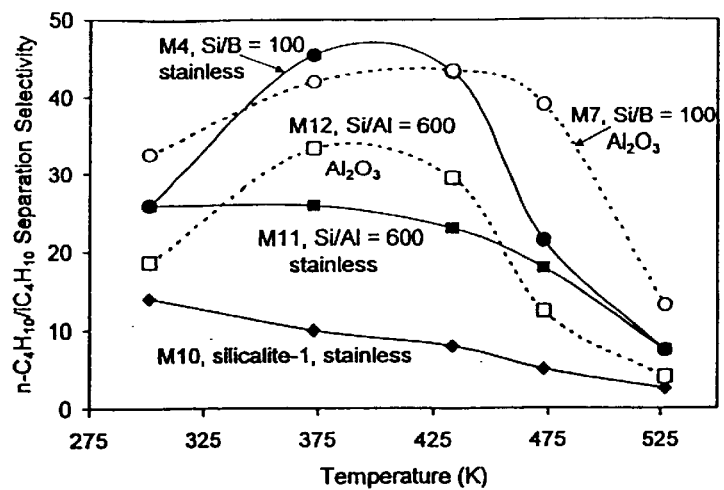
FIG. 12 shows $n$-$C_4H_{10}$/$i$-$C_4H_{10}$ separation selectivity as a function of temperature for alkali free B-ZSM-5, Al-ZSM-5, and silicalite-1 membranes having various Si/Me molar ratios as indicated.

FIG. 12 demonstrates the relative influence of boron and aluminum substitution in the MFI structural framework. FIG. 12 shows n-$C_4H_{10}$/i-$C_4H_{10}$ separation selectivity as a function of temperature for alkali free B-ZSM-5 (M4, M7) and Al-ZSM-5 (M11, M12) membranes having various Si/Me molar ratios (100, 100, 600, 600). The boron and aluminum substituted membranes were prepared on stainless steel (M4, M11) and α-alumina (M7, M12). For comparison purposes, FIG. 12 also shows n-$C_4H_{10}$/i-$C_4H_{10}$ separation selectivity as a function of temperature for an alkali free silcalite-1 membrane prepared on stainless steel.

TABLE 4

Singe Gas Permeances and Selectivities at 473 K for Me-ZSM-5 Membranes

| Membrane | Si/Me | Permeance × 10⁹ (mol/m²/s/Pa) | | | | | n/i-$C_4H_{10}$ Selectivity | |
|---|---|---|---|---|---|---|---|---|
| | | $H_2$ | $CO_2$ | $N_2$ | n-$C_4H_{10}$ | i-$C_4H_{10}$ | Ideal | Separation |
| M1 | 50 | 48 | 40 | 30 | 30 | 6.0 | 5.0 | 6.0 |
| M2 | 25 | 110 | 89 | 70 | 68 | 23 | 3.0 | 3.4 |
| M3 | 12 | 180 | 100 | 81 | 80 | 23 | 3.5 | 3.9 |
| M4 | 100 | 40 | 32 | 20 | 20 | 1.0 | 20 | 22 |
| M5 | 25 | 60 | 51 | 24 | 25 | 0.78 | 32 | 35 |
| M6 | 12.5 | 57 | 53 | 31 | 37 | 0.57 | 65 | 27 |
| M7 | 100 | 95 | 88 | 46 | 59 | 2.2 | 27 | 39 |
| M8 | 25 | 162 | 162 | 79 | 60 | 2.5 | 24 | 27 |
| M9 | 12.5 | 250 | 250 | 112 | 162 | 2.7 | 60 | 61 |
| M10 | ∞ | 77 | 77 | 48 | 60 | 11 | 5.4 | 5.0 |
| Fe-ZSM-5 | 100 | 100 | 70 | 40 | 42 | 6 | 7 | 8 |
| Ge-ZSM-5 | 100 | 140 | 120 | 100 | 110 | 7.5 | 14.7 | 14 |

In addition to the observations noted above, it appeared that for all substituted ZSM-5 membranes, single gas permeances at 473 K showed a decreasing trend as the kinetic diameter of the molecule increased. All substituted membranes separated n-$C_4H_{10}$/i-$C_4H_{10}$, n-$C_4H_{10}$/$H_2$, and $H_2$/i-$C_4H_{10}$ mixtures, and separation selectivity seemed to depend on the identity of the substituted metal or metalloid. However, no trend with acidity or hydrophobicity was observed. For most separations studied, the substituted membranes exhibited higher separation selectivity than a silicalite-1 membrane. The B-ZSM-5 membranes appeared to exhibit the highest separation selectivity; of these, membranes prepared from alkali-free gels exhibited the highest separation selectivity. The highest ideal selectivity at 473 K and 527 K was 60 and 24, respectively. For most B-ZSM-5 alkali-free membranes, n/i-$C_4H_{10}$ ideal selectivity and separation selectivity increased with boron content, and membranes prepared on α-alumina supports appeared to exhibit higher permeance and separation selectivity than comparable membranes prepared on stainless steel supports. It appears that n-$C_4H_{10}$/i-$C_4H_{10}$ separation is due to differences in diffusion rates and adsorption coverage.

Example 5

Separation of Binary Mixtures of Normal Butane and Hydrogen and Isobutane and Hydrogen Three isomorphously substituted ZSM-5 membranes of Example 1 (M4, Fe-ZSM-5, Ge-ZSM-5) were used to separate binary mixtures of normal butane and hydrogen, and isobutane and hydrogen. For comparison purposes, a ZSM-5 membrane (M4) and a silcalite-1 membrane (M10) were also used to separate the n-$C_4H_{10}$/$H_2$ and i-$C_4H_{10}$/$H_2$ mixtures. Permeation rates at temperatures ranging from 300 K to 523 K were measured using a system similar to the apparatus described in Example 4. The single-gas permeation rates were measured by sealing the membrane in a stainless steel module with silicone o-rings in a dead end mode. The pressure drop across the membrane was 138 kPa, and the permeate side pressure was 83 kPa. The ratio of single-gas permeances is referred to as the ideal selectivity.

To measure mixture permeance, each of the binary mixtures was formed by evaporating n-$C_4H_{10}$ or i-$C_4H_{10}$/$H_2$ into a helium stream flowing within the tubular membrane. The membrane was located in a stainless steel module that was heated by heating tapes. Each hydrocarbon mixture contained about 50/50 v/v mixture of n-$C_4H_{10}$/$H_2$ or i-$C_4H_{10}$/$H_2$. During an experiment, both sides of the membrane were maintained at atmospheric pressure, and an argon sweep gas provided a driving force across the membrane by removing the permeating components. The permeate stream was analyzed using a gas chromatograph equipped with a flame ionization detector, as described in Example 4, and a log-mean pressure driving force was used to calculate permeance. Permselectivity was calculated as the ratio of the permeances.

Figure 13:
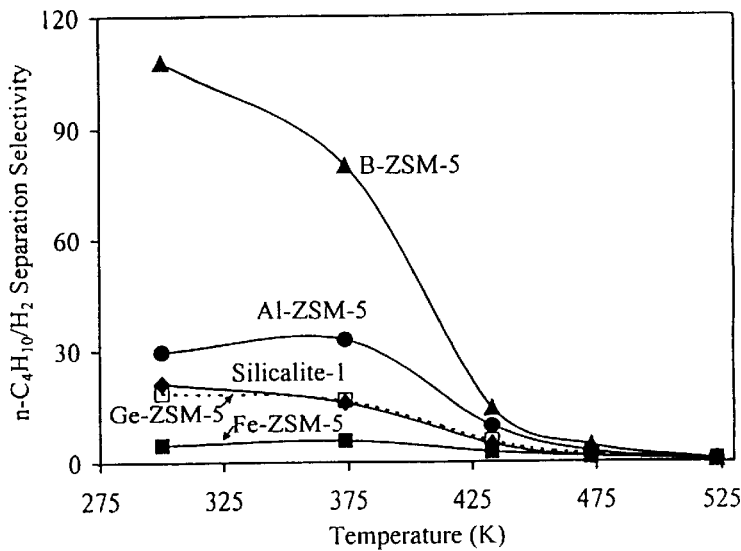
FIG. 13 shows $n$-$C_4H_{10}$/$H_2$ separation selectivity as a function of temperature for silcalite-1 and substituted ZSM-5 zeolite membranes prepared on stainless steel supports.
Figure 14:
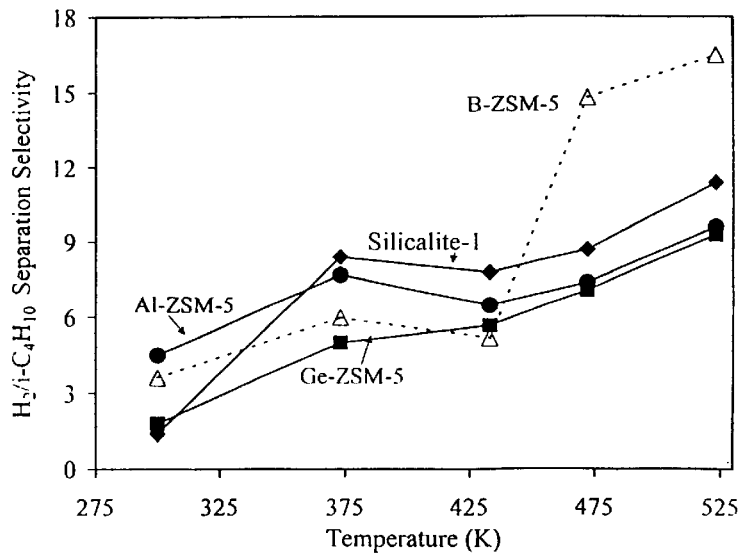
FIG. 14 shows $H_2$/$i$-$C_4H_{10}$ separation selectivity as a function temperature for silcalite-1 and substituted ZSM-5 zeolite membranes prepared on stainless steel supports.

FIGS. 13–14 show the results of the permeation experiments. FIG. 13 shows n-$C_4H_{10}$ separation selectivity as a function temperature for the silcalite-1 and substituted ZSM-5 zeolite membranes. Because of preferential adsorption of normal butane, $H_2$ mixture permeance was significantly lower than its single gas permeance. As shown in FIG. 13, separation selectivity was highest at about room temperature, where the n-$C_4H_{10}$ coverage (adsorption) was highest, and strongly decreased with increasing temperature. At higher temperatures, the n-$C_4H_{10}$ coverage decreased and could not effectively inhibit $H_2$ transport, resulting in decreased n-$C_4H_{10}$ separation selectivity at higher temperatures. This conclusion is supported by permeation measurements, which indicate that separation selectivity increases with increasing concentration of n-$C_4H_{10}$ in the feed stream.

As shown in FIG. 13, n-$C_4H_{10}$/$H_2$ separation selectivity depended strongly on the substituted metal or metalloid, and at room temperature, increased in the following order: Fe-ZSM-5<silicalite-1<Ge-ZSM-5<Al-ZSM-5<B-ZSM-5. Based on permeance measurements, the higher selectivity was the result of lower $H_2$ permeance rather than higher n-$C_4H_{10}$ permeance. Although large differences in selectivity were probably the result of different adsorption strengths of n-$C_4H_{10}$ within different zeolites, the order of separation selectivity did not correlate with acid strength or hydrophobicity/hydrophilicity.

FIG. 14 shows $H_2$ separation selectivity for i-$C_4H_{10}$/$H_2$ mixtures as a function temperature for the silcalite-1 and substituted ZSM-5 zeolite membranes. In contrast to the n-$C_4H_{10}$/$H_2$ mixtures, $H_2$ permeated faster than i-$C_4H_{10}$ for all membranes, even at low temperatures. At low temperatures, $H_2$ permeance in the mixture was lower than its single gas permeance, but was two to four times higher than $H_2$ permeance in the $H_2$/n-$C_4H_{10}$ mixture, indicating that i-$C_4H_{10}$ blocked $H_2$ permeation, but less effectively than n-$C_4H_{10}$. Thus, $H_2$ permeated faster than i-$C_4H_{10}$ in the mixture. Like the n-$C_4H_{10}$/$H_2$ mixtures, increasing i-$C_4H_{10}$ concentration in the feed inhibited $H_2$ permeation and therefore decreased $H_2$/i-$C_4H_{10}$ separation selectivity.

As can be seen in FIG. 14, the $H_2$/i-$C_4H_{10}$ separation selectivity at 523 K increased in the following order: silicalite-1 <Fe-ZSM-5<Ge-ZSM-5<Al-ZSM-5<B-ZSM-5. The B-ZSM-5 membrane had the highest selectivity because it had the lowest i-$C_4H_{10}$ permeance.

Example 6

Separation of N-Hexane From Binary Mixtures Containing 2,2 Dimethylbutane, Benzene or Cyclohexane Two of the B-ZSM-5 membranes (M6, M9) of Example 1 were used to separate n-hexane from binary mixtures containing 2,2 dimethylbutane, benzene or cyclohexane. Vapor permeation rates were measured using a system similar to system described in Example 4 at temperatures ranging from 373 K to 524 K. The hydrocarbon mixture was evaporated into a helium stream flowing within the tubular membrane. The membrane was located in a stainless steel module that was heated by heating tapes. Each of the binary hydrocarbon mixtures contained about 50 vol. % n-hexane, and the feed stream contained about 10 vol. % hydrocarbon and 90 vol. % helium. During an experiment, both sides of the membrane were maintained at atmospheric pressure, and a helium sweep gas provided a driving force across the membrane by removing the permeating components. The permeate stream was analyzed using a gas chromatograph equipped with a flame ionization detector, as described in Example 4, and a log-mean pressure driving force was used to calculate permeance. Permselectivity was calculated as the ratio of the permeances.

Figure 15:
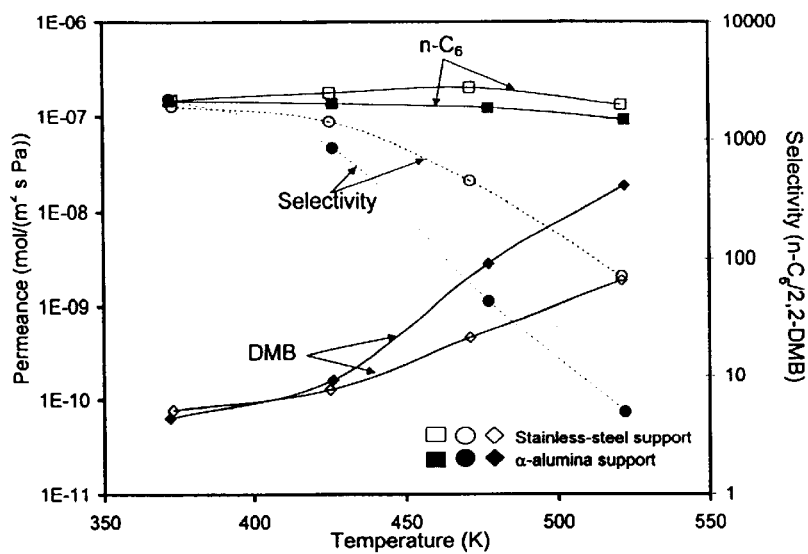
FIG. 15 shows n-hexane/2,2-DMB permeance and separation selectivity as functions of temperature for B-ZSM-5 zeolite membranes prepared on alumina and stainless steel supports.
Figure 16:
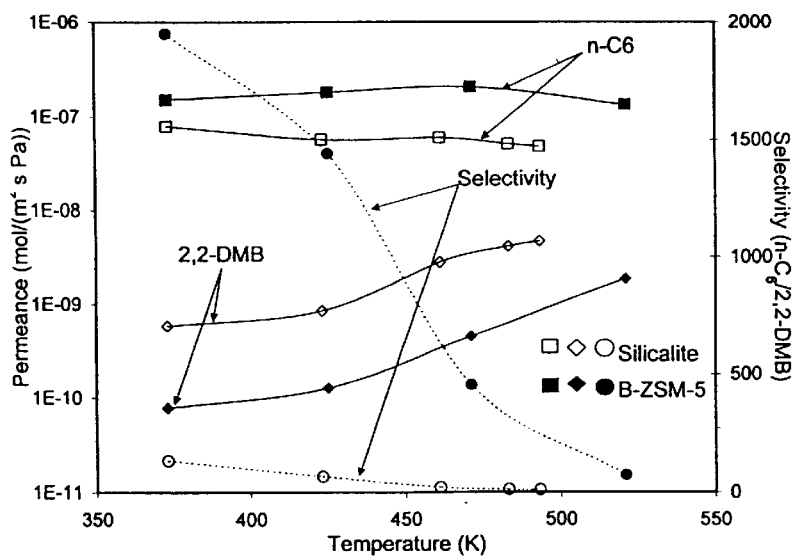
FIG. 16 shows n-hexane/2,2-DMB permeance and separation selectivity as functions of temperature for silicalite-1 and B-ZSM-5 zeolite membranes prepared on stainless steel supports.

Results of the permeation experiments are shown in Table 5 and FIGS. 15–16. Table 5 lists mixture permeance and separation selectivity for both B-ZSM-5 membranes (M6, M9). In addition to the binary mixtures disclosed in Table 5, the B-ZSM-5 membranes were used to separate a 50/25/25 mixture of n-hexane, cyclohexane, benzene mixture. The resulting separation selectivity ranged from 790–800 at 373 K, which is significantly higher than the separation selectivity for the binary mixtures shown in Table 5.

TABLE 5

Mixture Permeance and Separation Selectivity of 50/50 v/v normal hexane/organic mixtures for B-ZSM-5 Zeolite Membranes.

| | α-Alumina Support | | | Stainless Steel Support | | |
|---|---|---|---|---|---|---|
| | Permeance | | Selectivity | Permeance | | Selectivity |
| Organic | n-$C_6H_{14}$ | Organic | n-$C_6H_{14}$/ organic | n-$C_6H_{14}$ | Organic | n-$C_6H_{14}$/ organic |
| 2,2-DMB | 1.5 | 0.65 | 2280 | 1.5 | 0.78 | 1950 |
| Cyclo-hexane | 2.4 | 3.3 | 720 | 1.3 | 2.2 | 570 |
| Benzene | 2.4 | 5.5 | 440 | 1.0 | 2.6 | 370 |
| Benzene + Cyclo-hexane (50/50) | 2.2 | 2.8 | 790 | 1.5 | 1.8 | 800 |

FIG. 15 shows n-hexane/2,2-DMB permeance and separation selectivity as functions of temperature for both B-ZSM-5 zeolite membranes. Separation selectivity was highest (greater than 2000) at 373 K and decreased with increasing temperature; but even at 523 K, the B-ZMS-5 membrane supported on stainless steel (M6) separated the n-hexane/2,2-DMB mixture with selectivity of 72. FIG. 16 shows n-hexane/2,2-DMB permeance and separation selectivity as functions of temperature for silicalite-1 (M10) and one of the B-ZSM-5 zeolite membranes (M6). The B-ZSM-5 membrane exhibited higher n-hexane permeance and lower 2,2-DMB permeance than the silicalite-1 membrane. The B-ZSM-5 membrane exhibited the highest n-$C_6H_{14}$/2,2-DMB separation selectivity, which was higher than the separation selectivity of the silcalite-1 membrane.

Example 7

Separation of P-xylene and O-xylene Mixtures

Two B-ZSM-5 zeolite membranes (BZ1, BZ2) were used to separate binary mixtures of p-xylene and o-xylene. The membranes were prepared in a manner similar to membrane M4 of Example 1, except membranes BZ1 and BZ2 had four synthesis layers instead of two. The single-gas permeation rates were measured by sealing the membrane in a stainless steel module with silicone o-rings in a dead end mode. The pressure drop across the membrane was 138 kPa, and the permeate side pressure was 83 kPa.

Permeation rates for the xylene mixtures at temperatures ranging from 373 K to 525 K were measured using a system similar to the apparatus described in Example 4. Para-xylene/o-xylene mixtures were evaporated into a helium stream flowing within the tubular membrane to measure mixture permeance. The membrane was located in a stainless steel module that was heated by heating tapes. In most of the separations, the binary p-xylene/o-xylene mixtures contained about 50/50 v/v mixture of the two isomers. The partial pressure of each of the isomers varied among separations (0.4 kPa, 0.9 kPa, 2.1 kPa, 2.5 kPa). During an experiment, both sides of the membrane were maintained at atmospheric pressure, and a helium sweep gas provided a driving force across the membrane by removing the permeating components. Helium flow rates for both the feed and the sweep gas were set at about 40 $cm^3$/minute at STP using mass flow controllers. The permeate stream was analyzed using a gas chromatograph equipped with a flame ionization detector, as described in Example 4, and a log-mean pressure driving force was used to calculate permeance. Permselectivity was calculated as the ratio of the permeances.

Figure 17:
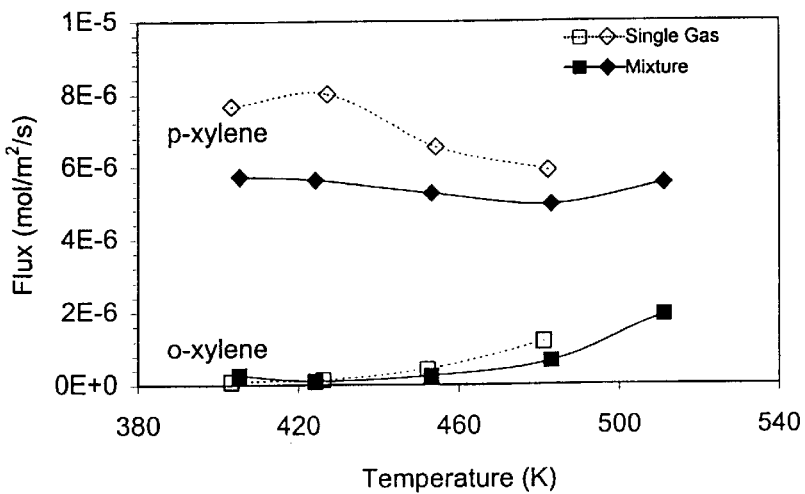
FIG. 17 shows p-xylene and o-xylene steady state fluxes as functions of temperature for B-ZSM-5 zeolite membrane BZ1 and a feed partial pressure of 2.1 kPa per isomer.
Figure 18:
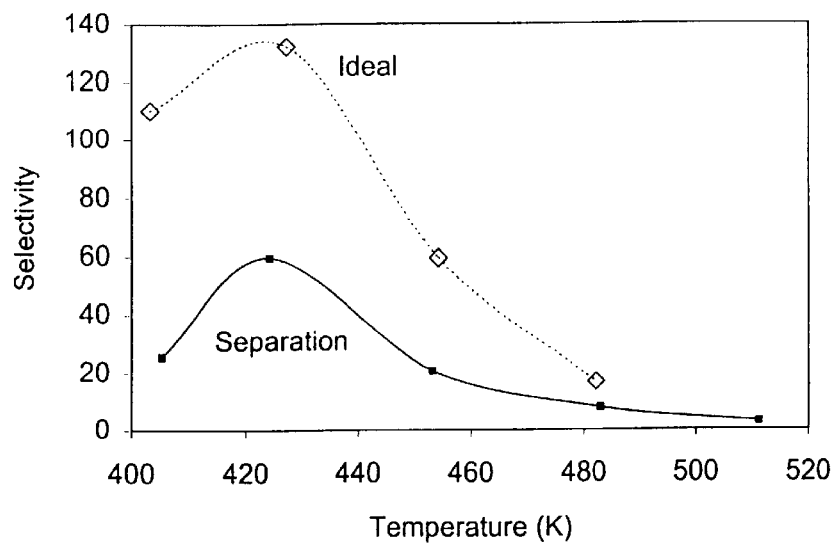
FIG. 18 shows p-xylene/o-xylene steady state separation selectivity as a function of temperature for B-ZSM-5 zeolite membrane BZ1 and a feed partial pressure of 2.1 kPa per isomer.
Figure 19:
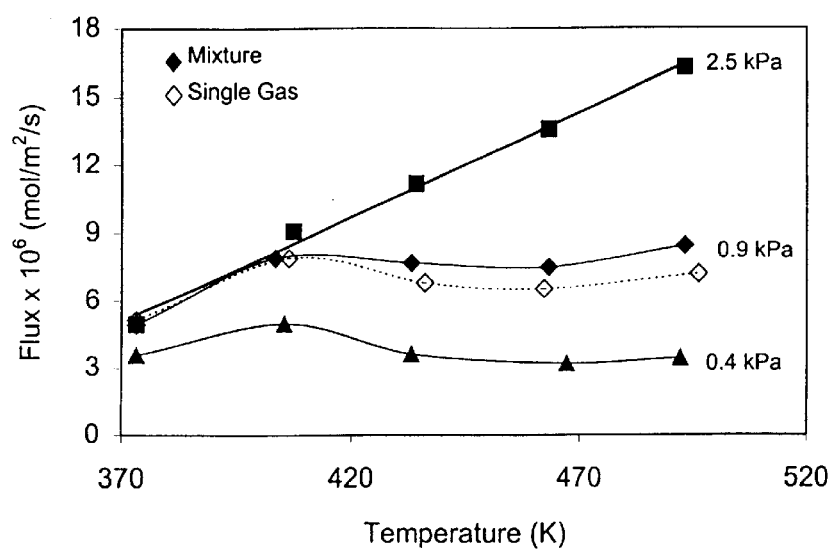
FIG. 19 shows flux of p-xylene as a function of temperature for B-ZSM-5 zeolite membrane BZ2 and various feed partial pressures.
Figure 20:
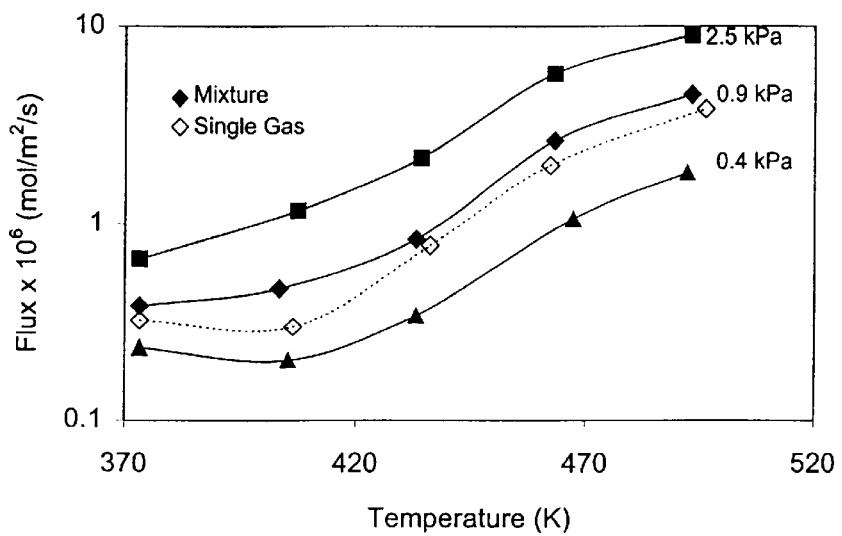
FIG. 20 shows flux of o-xylene as a function of temperature for B-ZSM-5 zeolite membrane BZ2 and various feed partial pressures.
Figure 21:
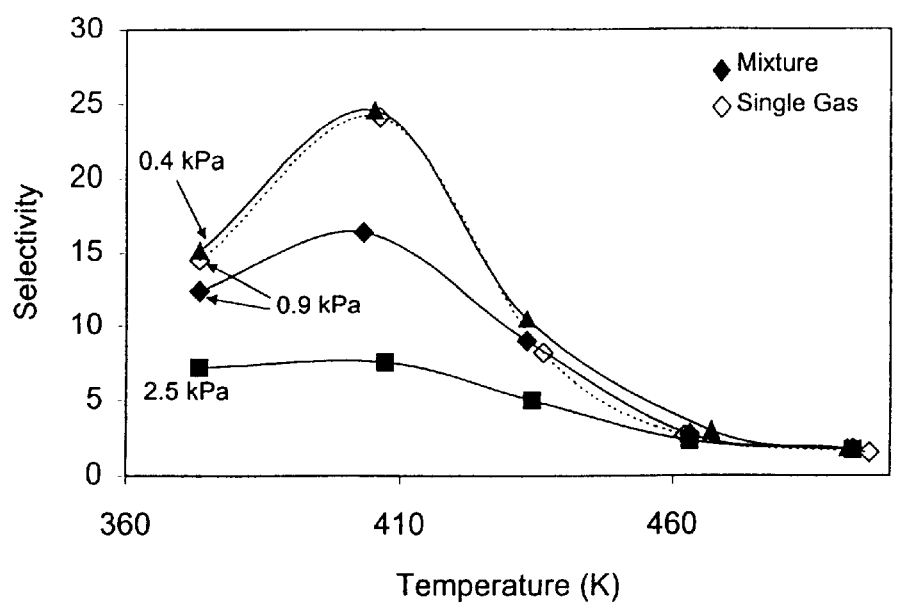
FIG. 21 shows separation selectivity for p-xylene/o-xylene mixtures as a function of temperature for B-ZSM-5 zeolite membrane BZ2 membrane and various feed partial pressures.

Results of the permeation experiments are shown in FIG. 17–FIG. 21. FIG. 17 and FIG. 18 show, as functions of temperature, p-xylene/o-xylene steady state fluxes and separation selectivities, respectively, for B-ZSM-5 zeolite membrane BZ1. The partial pressure of each of the isomers in the feed was 2.1 kPa. FIG. 19 and FIG. 20 show, as functions of temperature, fluxes of p-xylene and o-xylene, respectively, for B-ZSM-5 zeolite membrane BZ2 and various feed partial pressures. Finally, FIG. 21 shows the resulting separation selectivity for p-xylene/o-xylene mixtures as a function of temperature for B-ZSM-5 zeolite membrane BZ2 membrane and various feed partial pressures.

The above description is intended to be illustrative and not restrictive. Many embodiments and many applications besides the examples provided would be apparent to those of skill in the art upon reading the above description. The scope of the invention should therefore be determined, not with reference to the above description, but should instead be determined with reference to the appended claims, along with the full scope of equivalents to which such claims are entitled. The disclosures of all articles and references, including patent applications and publications, are incorporated by reference in their entirety for all purposes.

What is claimed is:

1. An article of manufacture comprising a porous support and a zeolite membrane layer disposed at least in part on the surface of en the porous support, the zeolite membrane layer being formed by in-situ crystallization and comprising an isomorphously substituted zeolite having a framework composition represented by the formula:

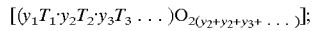

wherein $T_1$ is tetrahedrally coordinated Si, $T_2$ is a tetrahedrally coordinated element and is B, or Ge, or combinations thereof, $T_3$ is tetrahedrally coordinated Al, $y_1$, $y_2$, and $y_3$, are stoichiometric coefficients, and $T_1/T_2$ is between about 12 and about 600.

2. The article of manufacture of claim 1, wherein the membrane layer extends into pores of the porous support.

3. The article of manufacture of claim 1, wherein the support comprises a container having an interior surface, and the membrane layer is disposed on the interior surface of the container.

4. The article of manufacture of claim 1, wherein the support is made of stainless steel, α-alumina or β-alumina.

5. The article of manufacture of 1, wherein $y_3$ is substantially equal to zero.

6. An apparatus for separating one or more components from a multi-component mixture, the apparatus comprising at least one membrane unit, a device for introducing the multi-component mixture into the at least one membrane unit, and a device for removing the one or more components from the membrane unit, wherein the at least one membrane unit includes a porous support and a zeolite membrane layer disposed at least in part on the surface of the porous support, the zeolite membrane layer being formed by in-situ crystallization and comprising an isomorphously substituted zeolite having a framework composition represented by the formula:

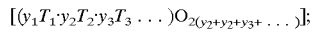

wherein $T_1$ is tetrahedrally coordinated Si, $T_2$ is a tetrahedrally coordinated element and is B, or Ge, or combinations thereof, $T_3$ is tetrahedrally coordinated Al, $y_1$, $y_2$, and $y_3$, are stoichiometric coefficients and $T_1/T_2$ is between about 12 and about 600.

7. The apparatus of claim 6, further comprising a plurality of membrane units.

8. A method of making an isomorphously substituted zeolite membrane, the method comprising:

preparing a porous support:

contacting the porous support with an aqueous zeolite-forming gel, the gel being substantially free of alkali hydroxides and comprising silica, a quaternary organic ammonium template, and a source of ions, wherein the ions are $Al^{+3}$, $Ge^{+4}$, $Fe^{+3}$, $Ga^{+3}$ or $B^{+3}$ or combinations thereof;

heating the support and the gel to form a zeolite layer at least in part on the surface of the porous support;

and calcining the zeolite layer to remove the template.

9. A method of making the article of manufacture of claim 1, the method comprising preparing a porous support:

contacting the porous support with an aqueous zeolite-forming gel, the gel being substantially free of alkali hydroxides and comprising silica, a quaternary organic ammonium template, and a source of ions, wherein the ions are $Al^{+3}$, $Ge^{+4}$, or $B^{+3}$ or combinations thereof;

heating the support and the gel to form a zeolite layer on the porous support;

and calcining the zeolite layer to remove the template.

10. The method of claim 9, further comprising washing and drying the zeolite layer.

11. The method of claim 9, further comprising repeating the providing and contacting steps until the zeolite layer is substantially impermeable to $N_2$.

12. The method of claim 9, wherein the porous support is a container having at least one opening and an inner surface.

13. The method of claim 12, further comprising placing the gel in the container and capping the at least one opening of the container.

14. The method of claim 9, wherein calcining includes maintaining the porous support and the gel at a temperature between about 403 K and about 469 K for at least about two hours.

15. The method of claim 9, wherein an acid hydrogen form of the isomorphously substituted zeolite membrane is synthesized directly from the gel.

16. The method of claim 9, wherein the quaternary organic ammonium template is tetrapropyl ammonium hydroxide, tetrapropyl ammonium bromide, tetrabutyl ammonium hydroxide, tetrabutyl ammonium bromide, tetraethyl ammonium hydroxide or tetraethyl ammonium bromide or combinations thereof.

17. The method of claim 9 wherein the source of ions comprises at least one of $Al(i-C_3H_7O)_3$, $Ge(C_2H_5O)_4$, $Fe(NO_3)_3$, and $B(OH)_3$.

18. A pervaporation method comprising the steps of:

providing a membrane of claim 1;

applying a multicomponent liquid mixture to one side of the membrane; and applying a vacuum to the other side of the membrane, thereby causing permeation of at least one of the components of the mixture through the membrane.

19. A vapor permeation method comprising the steps of:

providing a membrane of claim 1;

applying a multicomponent mixture to one side of the membrane, the mixture having components independently selected from the group consisting of vapors and gases; and providing a driving force for permeation, thereby causing permeation of at least one of the components of the mixture through the membrane.

20. An article of manufacture comprising a porous support and a zeolite membrane layer formed by in-situ crystallization at least in part on the surface of the porous support, the zeolite membrane layer comprising an isomorphously substituted zeolite having a framework composition represented by the formula:

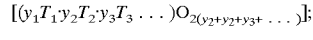

wherein $T_1$ is tetrahedrally coordinated Si, $T_2$ is a tetrahedrally coordinated element and is B, Ge, Ga, or Fe or combinations thereof, $T_3$ is tetrahedrally coordinated Al, and $y_1$, $y_2$, and $y_3$ are stoichiometric coefficients and the thickness of the zeolite membrane layer is greater than about 30 microns.

* * * * *